United States Patent
Kumazawa et al.

(10) Patent No.: US 9,511,514 B2
(45) Date of Patent: Dec. 6, 2016

(54) PROCESS FOR PRODUCTION OF REPLICA MOLD FOR IMPRINTING USE

(75) Inventors: Kazuhisa Kumazawa, Ichihara (JP); Hiromoto Shibata, Ichihara (JP)

(73) Assignee: NIPPON SODA CO., LTD., Tokyo (JP)

( * ) Notice: Subject to any disclaimer, the term of this patent is extended or adjusted under 35 U.S.C. 154(b) by 760 days.

(21) Appl. No.: 13/702,873

(22) PCT Filed: Jun. 21, 2011

(86) PCT No.: PCT/JP2011/003521
§ 371 (c)(1),
(2), (4) Date: Dec. 7, 2012

(87) PCT Pub. No.: WO2011/161944
PCT Pub. Date: Dec. 29, 2011

(65) Prior Publication Data
US 2013/0078333 A1   Mar. 28, 2013

(30) Foreign Application Priority Data

Jun. 23, 2010   (JP) ................................. 2010-143118

(51) Int. Cl.
*B29C 33/38*   (2006.01)
*B29C 71/04*   (2006.01)
(Continued)

(52) U.S. Cl.
CPC ....... *B29C 33/3878* (2013.01); *B29C 35/0805* (2013.01); *B29C 59/022* (2013.01);
(Continued)

(58) Field of Classification Search
None
See application file for complete search history.

(56) References Cited

U.S. PATENT DOCUMENTS

2010/0036012 A1* 2/2010 Kimura et al. ............... 522/172
2010/0200157 A1* 8/2010 Kimura et al. ............... 156/241

FOREIGN PATENT DOCUMENTS

EP            2161126 A1    3/2010
JP       A-2002-200623    7/2002
(Continued)

OTHER PUBLICATIONS

International Preliminary Report on Patentability issued in International Application No. PCT/JP2011/003521 dated Jan. 15, 2013.
(Continued)

*Primary Examiner* — Jacob Thomas Minskey
(74) *Attorney, Agent, or Firm* — Oliff PLC

(57) ABSTRACT

The present invention provides a method for producing a replica mold for imprinting use which is inexpensive and has good properties including strength and flexibility. The method for producing a replica mold according to the present invention comprises the steps of: (A) coating a substrate with an organic-inorganic hybrid material; (B) semi-curing the coated surface with heat and/or an electromagnetic ray to produce a substrate for fine raised and depressed pattern formation; (C) pressing a master mold having a predetermined fine raised and depressed pattern formed thereon against the substrate for fine raised and depressed pattern formation by an imprinting method to transfer the fine raised and depressed pattern onto the substrate; and (D) irradiating the substrate for fine raised and depressed pattern formation onto which the fine raised and depressed pattern is transferred with an electromagnetic ray to cure the substrate.

8 Claims, 12 Drawing Sheets

(51) Int. Cl.
  *B29C 35/08* (2006.01)
  *B29C 59/02* (2006.01)
  B29K 83/00 (2006.01)
  B29C 35/02 (2006.01)
  B29K 105/24 (2006.01)

(52) U.S. Cl.
  CPC ............ *B29C 71/04* (2013.01); *B29C 35/02* (2013.01); *B29C 2035/0827* (2013.01); *B29C 2059/023* (2013.01); *B29K 2083/00* (2013.01); *B29K 2105/243* (2013.01)

(56) References Cited

FOREIGN PATENT DOCUMENTS

| | | |
|---|---|---|
| JP | A-2007-55235 | 3/2007 |
| JP | A-2007-56162 | 3/2007 |
| JP | A-2007-216493 | 8/2007 |
| JP | A-2007-245684 | 9/2007 |
| JP | A-2007-320072 | 12/2007 |
| JP | A-2008-38136 | 2/2008 |
| WO | WO 2008/069217 A1 | 6/2008 |
| WO | WO 2009/004821 A1 | 1/2009 |
| WO | WO 2009/059089 A1 | 5/2009 |

OTHER PUBLICATIONS

Dec. 18, 2014 Search Report issued in European Application No. 11797833.8.
Chou et al., "Imprint of sub-25 nm vias and trenches in polymers," *Appl. Phys. Lett.,* Nov. 20, 1995, pp. 3114-3116, vol. 67, No. 21.
International Search Report issued in International Application No. PCT/JP2011/003521 dated Aug. 2, 2011 (w/translation).

\* cited by examiner

PROCESS FOR PRODUCTION OF REPLICA MOLD FOR IMPRINTING USE

TECHNICAL FIELD

The present invention relates to a method for producing a replica of a mold for imprinting use. The present application claims the benefit of Japanese Patent Application No. 2010-143118 filed on Jun. 23, 2010. The entire disclosure of the application is hereby incorporated by reference herein in its entirety.

BACKGROUND ART

In recent years, a technique which is referred to as an imprinting method and can faithfully transfer a microscopic pattern is developed as a method for forming a fine raised and depressed pattern (see Non-patent Document 1). In many cases, an imprinting method of a nano meter order is referred to as a nano imprinting method, and an imprinting method of a micro meter order is referred to as an imprinting method. Herein, both the methods are referred to as the imprinting method.

In the imprinting process, a mold is pressed against a resin to transfer a pattern formed on the mold onto the resin. It is difficult to use a mold material used herein for a long period of time because the mold material is generally expensive, and the pattern is broken and a resin is stuck. Then, a reduction in a production cost has been achieved by copying the pattern of the mold into a more inexpensive material and performing imprint using the pattern as a replica of a master while performing technical development for the long life of the mold as a master.

Hitherto, there have been known, for example, a polyamide oligomer (Patent Document 1), a glass-based and fluorine-based hydrocarbon polymers (Patent Document 2), a mixture of a high-molecular weight thermoplastic polymer and a low-molecular weight thermoplastic polymer (Patent Document 3), a cyclic olefin copolymer (Patent Document 4), a glass-based material, and polydimethylsiloxane, as a material of a replica mold for imprinting use.

However, the conventional materials have problems in strength, flexibility, and formability.

On the other hand, the present inventors have developed a composition containing a polysiloxane-based composition, an ultraviolet ray-curable compound, and a photosensitive compound as a thin film material having excellent abrasion resistance because the surface is mineralized and has a significantly high hardness, and also having an excellent adhesion with an adherend (Patent Document 5).

PRIOR ART DOCUMENTS

Patent Documents

Patent Document 1: Japanese unexamined Patent Application Publication No. 2007-216493
Patent Document 2: Japanese unexamined Patent Application Publication No. 2007-320072
Patent Document 3: Japanese unexamined Patent Application Publication No. 2008-38136
Patent Document 4: Japanese unexamined Patent Application Publication No. 2007-55235
Patent Document 5: WO 2008/069217

Non-Patent Documents

Non-patent Document 1: S. Y. Chou et al. Appl. Phys. Lett., vol. 67, 1995, P 3314

SUMMARY OF THE INVENTION

Object to be Solved by the Invention

Then, it is an object of the present invention to provide a method for producing a replica mold for imprinting use which is inexpensive and has good properties including strength and flexibility.

Means to Solve the Object

The present inventors made a keen study, and found out that by applying an organic-inorganic complex comprising a polysiloxane-based composition, an ultraviolet ray-curable compound, and a photosensitive compound which they themselves have invented previously (Patent Document 5) to a replica mold material for imprinting use, a fine raised and depressed pattern having excellent storage stability before use and providing a certain extent of flexibility can be formed, and the surface has a significantly high hardness as the surface is mineralized with the fine raised and depressed pattern maintained after curing, and thus having an excellent abrasion resistance. The present invention has been thus completed.

That is, the present invention relates to the following items:

(1) a method for producing a replica mold comprising the steps of:

(A) coating a substrate with an organic-inorganic hybrid material;

(B) semi-curing a coated surface with heat and/or an electromagnetic ray to produce a substrate for fine raised and depressed pattern formation;

(C) pressing a master mold having a predetermined fine raised and depressed pattern formed thereon against the substrate for fine raised and depressed pattern formation by an imprinting method to transfer the fine raised and depressed pattern onto the substrate; and (D) irradiating the substrate for fine raised and depressed pattern formation onto which the fine raised and depressed pattern is transferred with an electromagnetic ray to cure the substrate;

(2) the method for producing a replica mold according to the item (1), further comprising the step of (E) applying a mold releasing layer onto a surface of the fine raised and depressed pattern obtained in the step (D);

(3) the method for producing a replica mold according to the item (1), wherein the organic-inorganic hybrid material comprises a material for a mold releasing layer;

(4) the method for producing a replica mold according to any one of the items (1) to (3), wherein the organic-inorganic hybrid material comprises:

a) an organosilicon compound comprising:
a compound represented by the formula (I):

$$R^1{}_n SiX_{4-n} \quad (I)$$

(wherein n represents 1 or 2; when n is 2, each $R^1$ may be the same or different; $R^1$ represents an organic group; and one or more of $R^1$ represent a vinyl group-containing hydrocarbon group; X represents a hydroxyl group or a hydrolyzable group; and each X may be the same or different)

a compound represented by the formula (II):

$$R^2{}_n SiX_{4-n} \quad (II)$$

(wherein n represents 1 or 2; when n is 2, each $R^2$ may be the same or different; $R^2$ represents an organic group excluding a vinyl group-containing hydrocarbon group, which has a carbon atom bonded directly to Si in the formula; X represents a hydroxyl group or a hydrolyzable group; and each X may be the same or different), and a hydrolysis condensate thereof if present, wherein {[the compound of the formula (I)]+[a unit derived from the compound of the formula (I) in the hydrolysis condensate if present]}/{[the compound of the formula (I)]+[the compound of the formula (II)]+[a unit derived from the compound of the formula (I) in the hydrolysis condensate if present]+[a unit derived from the compound of the formula (II) in the hydrolysis condensate if present]}×100 is 30 to 100 mol %; and {[the compound of the formula (II)]+[a unit derived from the compound of the formula (II) in the hydrolysis condensate if present]}/{[the compound of the formula (I)]+[the compound of the formula (II)]+[a unit derived from the compound of the formula (I) in the hydrolysis condensate if present]+[a unit derived from the compound of the formula (II) in the hydrolysis condensate if present]}×100 is 0 to 70 mol %;

b) an electromagnetic ray-curable compound; and c) a silanol condensation catalyst;

(5) the method for producing a replica mold according to the item (4), wherein {[the compound of the formula (I)]+[a unit derived from the compound of the formula (I) in the hydrolysis condensate if present]}/{[the compound of the formula (I)]+[the compound of the formula (II)]+[a unit derived from the compound of the formula (I) in the hydrolysis condensate if present]+[a unit derived from the compound of the formula (II) in the hydrolysis condensate if present]}×100 is 30 to 95 mol %; and {[the compound of the formula (II)]+[a unit derived from the compound of the formula (II) in the hydrolysis condensate if present]}/{[the compound of the formula (I)]+[the compound of the formula (II)]+[a unit derived from the compound of the formula (I) in the hydrolysis condensate if present]+[a unit derived from the compound of the formula (II) in the hydrolysis condensate if present]}×100 is 5 to 70 mol %;

(6) the method for producing a replica mold according to the item (4) or (5), wherein the electromagnetic ray-curable compound is 80 mass % or less based on the total mass of the solid content of the composition; and (7) the method for producing a replica mold according to any one of the item (4) to (6), wherein the silanol condensation catalyst is a photosensitive compound.

The present invention also relates to (8) a replica mold obtained by a method according to any one of the items (1) to (7).

MODE OF CARRYING OUT THE INVENTION

Figure 1:
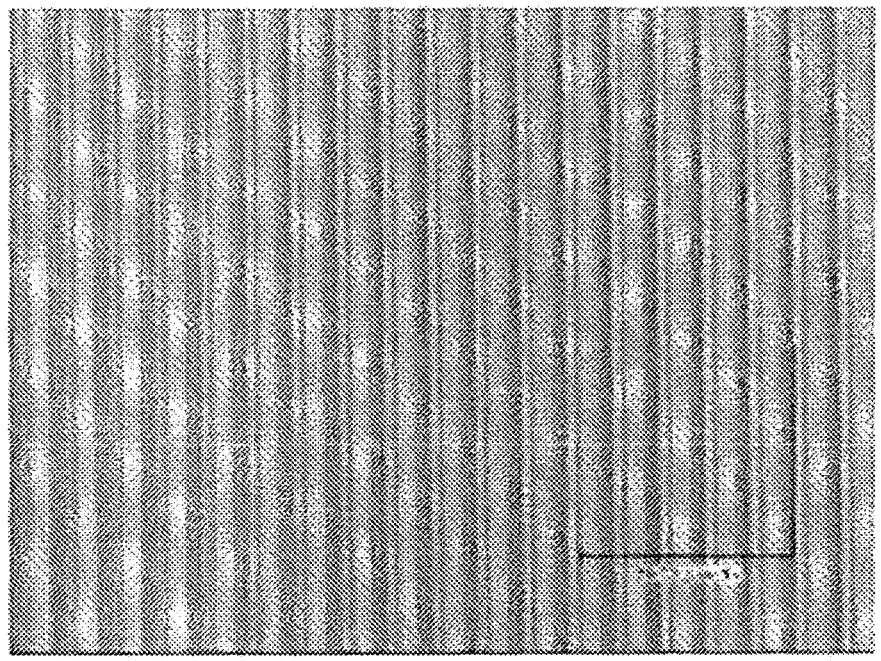
FIG. 1 is a photograph obtained by photographing a surface of a slide glass with an organic-inorganic hybrid material according to the present invention after pressing and removing a master mold, by means of a digital microscope in Example 1.

In the present invention, "a replica mold" means a replica of a mold used in an imprinting method pressing a mold (metal mold) having a fine raised and depressed pattern against a resin to transfer the fine raised and depressed pattern to the resin.

In addition, "an electromagnetic ray" means an ultraviolet ray, an X ray, a radioactive ray, an ionized radioactive ray, and an ionizing radioactive ray (α-, β-, γ-rays, neutron ray, electron ray).

"Semi-cured" means having no tack properties, and that it is cured so that no crack is generated by following the mold when molding. Further, "cured" means a state where it is cured to the extent that it does not scar easily with an abrasion by steel wool.

1. Organic-Inorganic Hybrid Material

An organic-inorganic hybrid material of the present invention is a composition for forming an organic-inorganic hybrid material layer to produce a fine raised and depressed pattern by laminating it on a substrate. The organic-inorganic hybrid material is not particularly limited as long as the organic-inorganic hybrid material can be irradiated with an electromagnetic ray to cure the organic-inorganic hybrid material without removing a master mold from a substrate for fine raised and depressed pattern formation onto which the fine raised and depressed pattern is transferred, as usual, and the organic-inorganic hybrid material can be irradiated with the electromagnetic ray, with the master mold removed from the substrate for fine raised and depressed pattern formation onto which the fine raised and depressed pattern is transferred, to cure the organic-inorganic hybrid material. The organic-inorganic hybrid material particularly preferably contains the following components.

a) Organosilicon Compound

An organosilicon compound in the organic-inorganic hybrid material of the present invention contains the following components:

a-1) a compound represented by the formula (I):

$$R^1{}_n SiX_{4-n} \quad (I)$$

(wherein n represents 1 or 2; when n is 2, $R^1$ may be the same or different; $R^1$ represents an organic group; and one or more of $R^1$ represent a vinyl group-containing hydrocarbon group; X represents a hydroxyl group or a hydrolyzable group; and X may foe the same or different);

a-2) a compound represented by the formula (II):

$$R^2{}_n SiX_{4-n} \quad (II)$$

(wherein n represents 1 or 2; when n is 2, may be the same or different; $R^2$ represents an organic group excluding the vinyl group-containing hydrocarbon group, which has a carbon atom bonded directly to Si in the formula; X represents a hydroxyl group or a hydrolyzable group; and X may be the same or different); and a-3) a hydrolysis condensate thereof if present.

The organosilicon compound in the organic-inorganic hybrid material of the present invention is a mixture of the compound represented by the formula (I), the compound represented by the formula (II), and the hydrolysis condensate thereof if present. The compound represented by the formula (II) and the hydrolysis condensate containing the compound as a unit may not necessarily exist. The hydrolysis condensate may be such as a dimer obtained by subjecting compounds to hydrolytic condensation to form a siloxane bond, and may be obtained by subjecting only the compound of the formula (I) or (II) to hydrolytic condensation. The hydrolysis condensate may be obtained by subjecting the compound of the formula (I) and the compound of the formula (II) to hydrolytic condensation. These two or more kinds may foe mixed.

{[The compound of the formula (I)]+[a unit derived from the compound of the formula (I) in the hydrolysis condensate if present]}/{[the compound of the formula (I)]+[the compound of the formula (II)]+[a unit derived from the compound of the formula (I) in the hydrolysis condensate if present]+[a unit derived from the compound of the formula (II) in the hydrolysis condensate if present]}×100 is preferably 30 to 100 mol %, and more preferably 30 to 95 mol %; and {[the compound of the formula (II)]+[a unit derived from the compound of the formula (II) in the hydrolysis condensate if present]}/{[the compound of the formula (I)]+[the compound of the formula (II)]+[a unit derived from the compound of the formula (I) in the hydrolysis condensate if present]+[a unit derived from the compound of the formula (II) in the hydrolysis condensate if present]}×100 is preferably 0 to 70 mol %, and more preferably 5 to 70 mol %.

The average particle diameter of the hydrolysis condensate is preferably 2 nm to 100 nm, and more preferably 5 nm to 30 nm. When the average particle diameter is greater than 100 nm, a film becomes clouded, and a solution becomes unstable, and is easily gelled. When the average particle diameter is smaller than 2 nm, a film coating property may be adversely affected.

In the formula (I), n represents 1 or 2, and n=1 is preferred. When n is 2, each $R^1$ may be the same or different. $R^1$ represents an organic group, and one or more of $R^1$ represent a vinyl group-containing hydrocarbon group. That is, when n is 1, $R^1$ is a vinyl group-containing hydrocarbon group. When n is 2, one or two of $R^1$ is the vinyl group-containing hydrocarbon group. A group excluding the vinyl group-containing hydrocarbon group is the organic group.

Examples of the organic group include a hydrocarbon group (containing the vinyl group-containing hydrocarbon group) which may contain a substituent, and a group made of a vinyl compound polymer which may contain a substituent.

Examples of the hydrocarbon group include an alkyl group, a cycloalkyl group, a vinyl group-containing hydrocarbon group, an alkynyl group, and an aryl group. Of these, a group excluding the vinyl group-containing hydrocarbon group is preferably a hydrocarbon group having 1 to 30 carbon atoms which may contain a substituent, and more preferably an alkyl group having 1 to 10 carbon atoms and an epoxyalkyl group having 1 to 10 carbon atoms.

Examples of the vinyl group-containing hydrocarbon group include alkenyl groups (preferably, alkenyl groups having 2 to 8 carbon atoms) such as a vinyl group, an allyl group, a 3-butenyl group, and a 4-hexenyl group, and cycloalkenyl groups (preferably, cycloalkenyl groups having 3 to 8 carbon atoms) such as a 2-cyclopropenyl group, a 2-cyclopentenyl group, a 3-cyclohexenyl group, and a 4-cyclooctenyl group.

The organic group may contain a silicon atom, and may be a group containing polymers such as polysiloxane, polyvinylsilane, and polyacrylsilane.

Herein, examples of the alkyl group include methyl, ethyl, propyl, isopropyl, butyl, sec-butyl, tert-butyl, isobutyl, amyl, isoamyl, tert-amyl, hexyl, heptyl, isoheptyl, tert-heptyl, n-octyl, isooctyl, tert-octyl, and 2-ethylhexyl. Of these, an alkyl group having 1 to 10 carbon atoms is preferred.

Examples of the cycloalkyl group include cyclopropyl, cyclobutyl, cyclopentyl, cyclohexyl, and cycloheptyl. Of these, a cycloalkyl group having 3 to 8 carbon atoms is preferred.

Examples of the alkynyl group include an ethynyl group, a 1-propynyl group, a 2-propynyl group, a 1-butynyl group, a 2-butynyl group, a 3-butynyl group, a 1-methyl-2-propynyl group, a 2-methyl-3-butynyl group, a 1-pentynyl group, a 2-pentynyl group, a 3-pentynyl group, and a 4-pentynyl group. Of these, an alkynyl group having 2 to 6 carbon atoms is preferred.

The aryl group means a monocyclic or polycyclic aryl group. The polycyclic aryl group includes a partially saturated group in addition to a fully saturated group. Examples of the aryl group include a phenyl group, a naphthyl group, an azulenyl group, an indenyl group, an indanyl group, and a tetralinyl group. Of these, an aryl group having 6 to 10 carbon atoms is preferred.

Examples of "a substituent" in the phrase "may contain a substituent" include a halogen atom, an alkoxy group, an alkenyloxy group, an alkenylcarbonyloxy group, and an epoxy group.

Examples of the halogen atom include fluorine, chlorine, bromine, and iodine.

Examples of the alkoxy group include methoxy, ethoxyl, n-propoxy, isopropoxy, n-butoxy, isobutoxy, sec-butoxy, tert-butoxy, n-pentoxy, isopentoxy, neopentoxy, 1-methylbutoxy, n-hexyloxy, isohexyloxy, and 4-methylpentoxy. An alkoxy group having 1 to 10 carbon atoms is preferred.

The alkenyloxy group is a group wherein an alkenyl group having a carbon-carbon double bond at one or more sites is bound to an oxygen atom. Examples thereof include vinyloxy, 2-propenyloxy, 3-butenyloxy, and 4-pentenyloxy. An alkenyloxy group having 2 to 10 carbon atoms is preferred.

The alkenylcarbonyloxy group is a group wherein an alkenyl group is bound with a carbonyloxy group. Examples thereof include acryloyloxy, methacryloyloxy, allylcarbonyloxy, and 3-butenylcarbonyloxy. An alkenylcarbonyloxy group having 2 to 10 carbon atoms is preferred.

Examples of the vinyl compound polymer which may contain a substituent include vinyl polymers obtained by homopolymerizing or copolymerizing (meth)acrylic esters such as methyl(meth)acrylate, ethyl(meth)acrylate, butyl(meth)acrylate, (meth)acrylate 2-ethylhexyl, and cyclohexyl (meth)acrylate;
acid anhydrides of carboxylic acids such as (meth)acrylic acid, itaconic acid, fumaric acid, and maleic acid anhydrides;
epoxy compounds such as glycidyl(meth)acrylate;
amino compounds such as diethylaminoethyl(meth)acrylate and aminoethyl vinyl ether;
amido compounds such as (meth)acrylamide, itaconic diamide, α-ethylacrylamide, crotonamide, fumaric diamide, maleic diamide, N-butoxy methyl(meth)acrylamide; and
vinyl compounds selected from acrylonitrile, styrene, α-methylstyrene, vinyl chloride, vinyl acetate, and vinyl propionate.

In the formula (II), n represents 1 or 2, and n=1 is more preferred. When n is 2, each $R^2$ may be the same or different. $R^2$ represents an organic group excluding a vinyl group-containing hydrocarbon group which has a carbon atom bonded directly to Si in the formula. Examples of the organic group of $R^2$ include the organic groups of $R^1$.

In the formula (I) and the formula (II), X represents a hydroxyl group or hydrolyzable group. Each X may be the same or different. The hydrolyzable group means a group which can generate a silanol group by being hydrolyzed, when heated at 25 to 100° C., for an example, in the absence of catalyst and in the copresence of excess water; or a group which can form a siloxane condensate. Specific examples include an alkoxy group, an acyloxy group, a halogen atom, and an isocyanate group. An alkoxy group having 1 to 4 carbon atoms or an acyloxy group having 1 to 4 carbon atoms is preferred.

Examples of the alkoxy group having 1 to 4 carbon atoms include a methoxy group, an ethoxy group, a n-propoxy group, an isopropoxy group, a n-butoxy group, a sec-butoxy group, and a t-butoxy group. Examples of the acyloxy group having 1 to 4 carbon atoms include acyloxy groups such as formyloxy, acetyloxy, and propanoyloxy.

Specific examples of the compound represented by the formula (I) include vinyltrimethoxysilane, vinyltrichlorosilane, vinyltriethoxysilane, vinyltributoxysilane, vinyltriisopropoxysilane, allyltrimethoxysilane, 3-butenyltrimethoxysilane, 2-cyclopropenyltrimethoxysilane, 2-cyclopentenyltrimethoxysilane, 2-cyclohexenyltrimethoxysilane, divinyldiaminosilane, divinyldichlorosilane, divinyldiacetoxysilane, divinyldimethoxysilane, diallyldimethoxysilane, di-3-butenyldimethoxysilane, vinylmethyldimethoxysilane, vinylethyldiethoxysilane, allylmethyltrimethoxysilane, and allylethyltriethoxysilane.

Examples of the compound represented by the formula (II) include methyltrichlorosilane, methyltrimethoxysilane, methyltriethoxysilane, methyltributoxysilane, ethyltrimethoxysilane, ethyltriisopropoxysilane, ethyltributoxysilane, butyltrimethoxysilane, pentafluorophenyl trimethoxysilane, phenyltrimethoxysilane, nonafluorobutylethyltrimethoxysilane, trifluoromethyltrimethoxysilane, dimethyldiaminosilane, dimethyldichlorosilane, dimethyldiacetoxysilane, dimethyldimethoxysilane, diphenyldimethoxysilane, dibutyldimethoxysilane, trimethylchlorosilane, 3-(meth)acryloxypropyl trimethoxysilane, γ-glycidoxypropyltrimethoxysilane, 3-(3-methyl-3-oxetanemethoxy)propyltrimethoxysilane, oxacyclohexyltrimethoxysilane, methyltri(meth)acryloxysiiane, methyl[2-(meth)acryloxyethoxy]silane, methyl-triglycydiloxysilane, and methyltris(3-methyl-3-oxetanemethoxy)silane.

These can be used alone or two or more kinds of them can be used in combination.

When using the organosilicon compounds in combination, preferred examples of combination include the combination of vinyltrimethoxysilane and 3-methacryloxypropyltrimethoxysilane; and the combination of vinyltrimethoxysilane and 3-glycidoxypropyl trimethoxysilane.

These organosilicon compounds may be a condensate. Specific examples of the condensate include a dimer wherein the organosilicon compounds are subjected to hydrolytic condensation to form a siloxane bond.

Among the organosilicon compounds represented by the formula (I), those of which carbon number of $R^1$ is 3 or less are 30 mol % or more based on the organosilicon compound represented by the formula (I), and more preferably 50 to 100 mol %. Those of which carbon number of $R^1$ is 4 or more are 70 mol % or less based on the compound represented by the formula (I), and more preferably 0 to 50 mol %.

b) Electromagnetic Ray-Curable Compounds

The electromagnetic ray-curable compound of the present invention is a compound polymerizing by irradiation with an active energy ray. Particularly, it is a compound or resin having a functional group which causes a polymerization reaction by irradiation with an ultraviolet ray in the presence of a photopolymerization initiator. Examples thereof include (meth)acrylate compounds, epoxy resin, and vinyl compounds excluding acrylate compounds. The number of functional group is not particularly limited as long as it is 1 or more.

Examples of the acrylate compounds include polyurethane(meth)acrylate, polyester(meth)acrylate, epoxy(meth) acrylate, polyamido(meth)acrylate, polybutadiene(meth) acrylate, polystyryl(meth)acrylate, polycarbonate diacrylate, tripropylene glycol di(meth)acrylate, hexane dioldi(meth) acrylate, trimethylol propane tri(meth)acrylate, pentaerythritol tri(meth)acrylate, and siloxane polymers having a (meth)acryloyloxy group. Polyester(meth)acrylate, polyurethane(meth)acrylate, and epoxypoly(meth)acrylate are preferred, and polyurethane(meth)acrylate is more preferred.

The molecular weight is not limited as long as it has compatibility with other hard coat layer compositions. Usually, a mass-average molecular weight is 500 to 50,000, and preferably 1,000 to 10,000.

An epoxy(meth)acrylate can be obtained, for example, from an esterification reaction of an oxirane ring of a low molecular weight bisphenol-type epoxy resin or novolac epoxy resin and acrylic acid.

Polyester(meth)acrylate is obtained, for example, by esterifying with acrylic acid a hydroxyl group of polyester oligomer having a hydroxyl group at both ends which is obtained by a condensation of multivalent carboxylic acid and multivalent alcohol. Alternatively, it is obtained by esterifying with acrylic acid a hydroxyl group at the end of an oligomer obtained by adding alkyleneoxide to a multivalent carboxylic acid.

Urethane(meth)acrylate is a reaction product of an isocyanate compound obtained by reacting polyol and diisocyanate, and an acrylate monomer having a hydroxyl group. Examples of polyol include polyester polyol, polyether polyol, and polycarbonate diol.

Commercialized products of urethane(meth)acrylate used in the present invention include the followings: manufactured by Arakawa Chemical Industries, Ltd.; Product Name: BEAM SET102, 502H, 505A-6, 510, 550B, 551B, 575, 575CB, EM-90, EM92;
manufactured by San Nopco Limited; Product Name: Photomer 6008, 6210;
manufactured by Shin-Nakamura Chemical Co., Ltd.; Product Name: NK oligo U-2PPA, U-4HA, U-6HA, H-15HA, UA-32PA, U-324A, U-4H, U-6H;
manufactured by Toagosei Co., Ltd.; Product Name: Alonix M-1100, M-1200, M-1210, M-1310, M-1600, M-1960;
manufactured by Kyoeisha Chemical Co., Ltd.; Product Name: AH-600, AT606, UA-306H;
manufactured by Nippon. Kayaku Co., Ltd.; Product Name: KAYARAD UX-2201, UX-2301, UX-3204, UX-3301, UX-4101, UX-6101, UX-7101;
manufactured by The Nippon Synthetic Chemical Industry Co., Ltd.; Product Name: Ultraviolet UV-1700B, UV-3000B, UV-6100B, UV-6300B, UV-7000, UV-7600B, UV-2010B, UV-7610B, UV-7630B, UV-7550B;
manufactured by Negami Chemical Industrial Co., Ltd.; Product Name: ART RESIN UN-1255, UN-5200, HDP-4T, HMP-2, UN-901T, UN-3320HA, UN-3320HB, UN-3320HC, UN-3320HS, H-61, HDP-M20;
manufactured by Daicel UCB Company Ltd.; Product Name: Ebecryl 6700, 204, 205, 220, 254, 1259, 1290K, 1748, 2002, 2220, 4833, 4842, 4866, 5129, 6602, 3301; and manufactured by Daicel-Cytec Company Ltd.; Product Name: ACA200M, ACAZ230AA, ACAZ250, ACAZ300, ACAZ320.

Examples of vinyl compounds excluding acrylate compounds include N-vinyl pyrrolidone, N-vinylcaprolactam, vinyl acetate, styrene, and unsaturated polyester. Examples of epoxy resin include hydrogen added-bisphenol A diglycidyl ether, 3,4-epoxycyclohexylmethyl-3,4-epoxycyclohexane carboxylate, 2-(3,4-epoxycyclohexyl-5,5-spiro-3,4-epoxy)cyclohexane-metha-dioxane, and bis(3,4-epoxycyclohexylmethyl)adipate.

Examples of photopolymerization initiator include (i) a compound which generates cationic species by light irradiation; and (ii) a compound which generates active radical species by light irradiation.

As the compound which generates cat ionic species by light irradiation, for example, an onium salt having a structure shown by the following formula (III) can be suitably exemplified.

The onium salt is a compound which releases Lewis acid by receiving light.

$$[R^1_a R^2_b R^3_c R^4_d W]^{+e}[ML_{e+f}]^{-e} \quad (III)$$

(In the formula (III), cation is an onium ion; W is S, Se, Te, P, As, Sb, Bi, O, I, Br, Cl or N≡N—; $R^1$, $R^2$, $R^3$ and $R^4$ are the same or different organic group; a, b, c, and d are each an integer of 0 to 3; and (a+b+c+d) is equal to the valence of W; M is a metal or metalloid constituting the central atom of the halogenated complex $[ML_{e+f}]$, and examples include B, P, As, Sb, Fe, Sn, Bi, Al, Ca, In, Ti, Zn, Sc, V, Cr, Mn, and Co. L is, for example, a halogen atom such as F, Cl, and Br. "e" is a net charge of a halogenated complex ion, and "f" is an atomic value of M.)

Specific examples of negative ion $(ML_{e+f})$ in the formula (III) include tetrafluoroborate $(BF_4^-)$, hexafluorophosphate $(PF_6^-)$, hexafluoroantimonate $(SbF_6^-)$, hexafluoroarcenate $(AsF_6^-)$, and hexachloroantimonate $(SbCl_6^-)$.

An onium salt, having a negative ion represented by formula $[MLf(OH)^-]$ can also be used. Further, it may be an onium salt having other negative ions such as perchlorate ion $(ClO_4^-)$, trifluoromethane sulfonate ion $(CF_3SO_3^-)$, fluorosulfonate ion $(FSO_3^-)$, toluenesulfonate ion, trinitrobenzene sulfonate negative ion, and trinitrotoluene sulfonate negative ion. These can be used alone or two or more kinds of them can be used in combination.

Examples of a compound which generates active radical species by light irradiation include, acetophenone, acetophenone benzyl ketal, 1-hydroxycyclohexyl phenyl ketone, 2,2-dimethoxy-1,2-diphenylethan-1-one, xanthone, fluorenone, benzaldehyde, fluoreine, anthraquinone, triphenylamine, carbazole, 3-methylacetophenone, 4-chlorobenzophenone, 4,4'-dimethoxybenzophenone, 4,4'-diaminobenzophenone, benzoin propyl ether, benzoin ethyl ether, benzyldimethyl ketal, 1-(4-isopropylphenyl)-2-hydroxy-2-methylpropan-1-one, 2-hydroxy-2-methyl-1-phenylpropan-1-one, thioxanthone, diethylthioxanthone, 2-isopropylthioxanthone, 2-chlorothioxanthone, 2-methyl-1-[4-(methylthio)phenyl]-2-morpholino-propan-1-one, 2-benzyl-2-dimethylamino-1-(4-morpholinophenyl)-butanone-1,4-(2-hydroxyethoxy) phenyl-(2-hydroxy-2-propyl)ketone, 2,4,6-trimethylbenzoyldiphenylphosphine oxide, bis-(2,6-dimethoxybenzoyl)-2,4,4-trimethylpentylphosphine oxide, and oligo(2-hydroxy-2-methyl-1-(4-(1-methylvinyl)phenyl) propanone).

As for the compounding level of the photopolymerization initiator used in the present invention, it is preferred to compound 0.01 to 20 mass % based on the solid content, of a (meth)acrylate ultraviolet ray-curable compound, and more preferably 0.1 to 10 mass %.

In the present Invention, a sensitizing agent may be added according to need. For example, trimethylamine, methyldimethanolamine, triethanolamine, p-dimethylaminoacetophenone, p-dimethylamino benzoic acid ethyl, p-dimethylamino benzoic acid isoamyl, N,N-dimethylbenzylamine, and 4,4'-bis(diethylamino)benzophenone can be used.

It is preferred that the ultraviolet ray-curable compound is 80 mass % or less based on the total mass of the solid content of the organic-inorganic hybrid material.

c) Silanol Condensation Catalyst

The silanol condensation catalyst is not particularly limited as long as it hydrolyses a hydrolyzable group in the compound represented by the formula (I), and condensates silanol to make a siloxane bond. Examples thereof include an organic metal, an organic acid metal salt, an acid, a base and a metal chelate compound. The silanol condensation catalysts can be used alone or two or more kinds of them can be used in combination.

Examples of the organic metal include alkyl metal compounds such as tetramethyl titanium and tetrapropyl zirconium, and metal alcoholates such as tetraisopropoxy titanium and tetrabutoxy zirconium.

Examples of the organic acid metal salt include carboxylic acid metal salts, sulfonic acid metal salts, and phenol metal salts.

Examples of the metal chelate compound include a β-ketocarbonyl compound, a β-ketoester compound, and an α-hydroxy ester compound.

Examples of the acid include an organic acid and mineral acid. Specific examples of the organic acid include acetic acid, formic acid, oxalic acid, carbonic acid, phthalic acid, trifluoro acetic acid, p-toluene sulfonic acid, and methane sulfonic acid. Specific examples of the mineral acid include hydrochloric acid, nitric acid, boric acid, and fluoroboric acid.

Herein, other examples of the acid include photo-acid-generating agents which generate acid by light irradiation. Specific examples thereof include diphenyliodonium hexafluorophosphate, and triphenylphosphonium hexafluorophosphate.

Examples of the base include strong bases such as tetramethylguanidine and tetramethylguanidylpropyltrimethoxysilane; organic amines, carboxylic acid neutralization salt of organic amine, and quaternary ammonium salt.

Of these, a photosensitive compound which can remove carbon components on the surface side by the action of a light having a wave length of 350 nm or less is particularly preferred.

The photosensitive compound is a compound which can remove carbon components on the surface side by the action of a light having a wavelength of 350 nm or less irradiated from the surface side, regardless of the mechanism thereof, and preferably a compound which can make the carbon content on the surface part at 2 nm in the depth direction from the surface to be 80% or less, more preferably 2 to 60%, and further preferably 2 to 40% based on the part where the carbon level is not reduced (in case of a film, for example, the back side part at 10 nm in the depth direction from the film back side). Particularly preferably is a compound which can remove carbon components to a certain depth so that the removed amount is gradually decreased from the surface side, specifically a compound which can form a layer wherein the carbon content increases gradually from the surface to a certain depth. Specifically, for example, a compound which excites by absorbing a light having a wavelength of 350 nm or less can be exemplified.

Herein, a light having a wavelength of 350 nm or less means a light formed by using a light source comprising a light having any wavelength of 350 nm or less as a component, preferably a light formed by using a light source comprising a light having any wavelength of 350 nm or less as a main component, specifically a light formed by using a light source comprising a light wherein the wavelength having the highest component level is 350 nm or less.

The photosensitive compound used in the present invention is at least one kind of compound selected from the group consisting of a metal chelate compound selected from Ti, Sn, Al, and Zr, a metal organic acid metal salt selected from Ti, Sn, Al, and Zr, a metal compound containing a metal selected from Ti, Sn, Al, and Zr and having 2 or more hydroxyl groups or hydrolyzable groups (excluding the metal chelate compound and the organic acid metal salt), a hydrolysate thereof, and a condensate thereof, and preferably a hydrolysate and/or condensate thereof. Particularly, a hydrolysate and/or condensate of a metal chelate compound is preferred. Examples of compounds derived therefrom include those further condensed from a condensate of a metal chelate compound. Such photosensitive compound and/or a derivative thereof may be chemically bound with an organosilicon compound, dispersed in a non-binding state, or in a mixed state of these, as described above.

As for the metal chelate compound selected from Ti, Sn, Al, and Zr, a metal chelate compound having a hydroxyl group or hydrolyzable group is preferred, and a metal chelate compound having 2 or more hydroxyl groups or hydrolyzable groups is more preferred. Having 2 or more hydroxyl groups or hydrolyzable groups means that the total of hydrolyzable group and hydroxyl group is 2 or more. As for the metal chelate compound, a β-ketocarbonyl compound, β-ketoester compound, and α-hydroxyester compound are preferred. Specifically, compounds wherein β-ketoesters such as methyl acetoacetate, n-propyl acetoacetate, isopropyl acetoacetate, n-butyl acetoacetate, sec-butyl acetoacetate, and t-butyl acetoacetate; β-diketones such as acetylacetone, hexane-2,4-dione, heptane-2,4-dione heptane-3,5-dione, octane-2,4-dione, nonane-2,4-dione, and 5-methyl-hexane-2,4-dione; and hydroxy carboxylic acids such as glycol acid and lactic acid are coordinated can foe exemplified.

The metal organic acid metal salt selected from Ti, Sn, Al, and Zr is a compound consisting of a metal ion and salt obtained from an organic acid. Examples of the organic acid include organic compounds exhibiting acidic property including: carboxylic acids such as acetic acid, oxalic acid, tartaric acid, and benzoic acid; sulfur containing organic acids such as sulfonic acid, sulfinic acid, and thiophenol; a phenol compound; enol compound; oxime compound; imido compound; and aromatic sulfonamide.

Metal compounds containing a metal selected from Ti, Sn, Al, and Zr and having 2 or more hydroxyl groups or hydrolyzable groups do not comprise the metal chelate compounds and organic acid metal salts. Examples thereof include hydroxides of the metals, and metal alcoholates such as propoxide, isopropoxide, and butoxide.

Examples of hydrolyzable groups in the metal compound, metal chelate compound or organic acid metal salt include an alkoxy group, acyloxy group, halogen group, and isocyanate group. An alkoxy group having 1 to 4 carbon atoms, and acyloxy group having 1 to 4 carbon atoms are preferred.

Having 2 or more hydroxyl groups or hydrolyzable groups means that the total of the hydrolyzable group and hydroxyl group is 2 or more.

A hydrolysate and/or condensate of such metal compound is preferred to be hydrolyzed by using 0.5 mol or more of water based on 1 mol of a metal compound having 2 or more hydroxyl groups or hydrolyzable groups, and more preferred to be hydrolyzed by using 0.5 to 2 mol of water.

A hydrolysate and/or condensate of the metal chelate compound is preferred to be hydrolyzed by using 5 to 100 mol of water based on 1 mol of the metal chelate compound, and more preferred to be hydrolyzed by using 5 to 20 mol of water.

A hydrolysate and/or condensate of the organic acid metal salt is preferred to be hydrolyzed by using 5 to 100 mol of water based on 1 mol of the organic acid metal salt, and more preferred to be hydrolyzed by using 5 to 20 mol of water.

In the present invention, when using 2 or more kinds of silanol condensation catalyst, it may comprise a compound with photosensitivity described above, or may not comprise a compound with photosensitivity. A compound having photosensitivity and a compound not having photosensitivity may used in combination.

The organic-inorganic hybrid material of the present invention contains a material of a mold releasing layer to be described later, and thereby the mold releasing layer can be formed without being performed as a fifth step.

2. Preparation of Organic-Inorganic Hybrid Material

A method for preparing the organic-inorganic hybrid material of the present invention comprises adding water and a solvent according to need, and mixing an organosilicon compound, an electromagnetic ray-curable compound, and a silanol condensation catalyst.

Specifically, known conditions and methods may be employed. It may be prepared according to the method described in, for example, WO2008/69217 pamphlet.

The solvent to be used is not particularly limited. Examples thereof include: aromatic hydrocarbon atoms such as benzene, toluene, and xylene; aliphatic hydrocarbon atoms such as hexane and octane; alicyclic hydrocarbon atoms such as cyclohexane and cyclopentane; ketones such as acetone, methylethylketone, and cyclohexanone; ethers such as tetrahydrofuran and dioxane; esters such as ethyl acetate and butyl acetate; amides such as N,N-dimethylformamide and N,N-dimethylacetoamide; sulfoxides such as dimethylsulfoxide; alcohols such as methanol, ethanol, propanol, and butanol; polyalcohol derivatives such as ethylene glycol monomethyl ether and ethylene glycol monomethyl ether acetate. These solvents can be used alone or two or more kinds of them can be used in combination.

When combining 2 or more kinds, for example, the combination of butanol/ethyl acetate/ethanol can be preferably exemplified.

The solid content of the organic-inorganic hybrid material of the present invention (organosilicon component, ultraviolet ray-curable compound, silanol condensation catalyst, and photopolymerization initiator) is preferably 1 to 75 mass %, and more preferably 10 to 60 mass %. The ultraviolet ray-curable compound is not particularly limited based on the total mass of the solid content of the organosilicon compound and/or a hydrolysis condensate thereof, silanol condensation catalyst, ultraviolet ray-curable compound, and photopolymerization initiator. It is preferably 30% or less, and more preferably 10 to 70%.

When the photosensitive compound is contained as the silanol condensation catalyst, the content of the photosensitive compound depends on the kind thereof. The metal atom in the photosensitive compound is generally 0.01 to 0.5 molar equivalents, and preferably 0.05 to 0.2 molar equivalents, based on Si in the organosilicon compound.

Tetrafunctional silane or colloidal silica can be added to the organic-inorganic hybrid material in order to enhance hardness of the obtained organic-inorganic hybrid material layer. Examples of the tetrafunctional silane include: tetraaminosilane, tetrachlorosilane, tetraacetoxysilane, tetramethoxysilane, tetraethoxysilane, tetrabutoxysilane, tetrabenzyloxysilane, tetraphenoxysilane, tetra(meth)acryloxysilane, tetrakis[2-(meth)acryloxyethoxy]silane, tetrakis(2-vinyloxyethoxy)silane, tetraglycidyloxysilane, tetrakis(2-vinyloxybutoxy)silane, and tetrakis(3-methyl-3-oxetanemethoxy)silane. As the colloidal silica, water-dispersible colloidal silica and colloidal silica wherein organic solvents such as methanol and isopropylalcohol are dispersed can be exemplified.

3. Substrate for Fine Raised and Depressed Pattern Formation

The substrate for fine raised and depressed pattern formation in the present invention is a substrate for producing a fine raised and depressed pattern, and is a substrate having a semi-cured material layer of the organic-inorganic hybrid material formed.

It means that the semi-cured material of the organic-inorganic hybrid material contains a compound in which at least a part of the organosilicon compound of the organic-inorganic hybrid material is subjected to hydrolytic condensation when heating processing is performed. It means that the semi-cured material contains a compound in which at least a part of the organosilicon compound in the organic mineral complex is subjected to hydrolytic condensation, and a compound in which a part of the electromagnetic ray-curable compound is cured, when an electromagnetic ray is used.

The semi-cured material of the organic-inorganic hybrid material of the present invention comprises:

a) an organosilicon compound comprising:
a compound represented by the formula (I):

$$R^1_n SiX_{4-n} \quad (I)$$

(wherein n represents 1 or 2; when n is 2, each $R^1$ may be the same or different; $R^1$ represents an organic group; and one or more of $R^1$ represent a vinyl group-containing hydrocarbon group; X represents a hydroxyl group or a hydrolyzable group; and each X may be the same or different), a compound represented by the formula (II):

$$R^2_n SiX_{4-n} \quad (II)$$

(wherein n represents 1 or 2; when n is 2, each $R^2$ may be the same or different; $R^2$ represents an organic group excluding a vinyl group-containing hydrocarbon group, which has a carbon atom bonded directly to Si in the formula; X represents a hydroxyl group or a hydrolyzable group; and each X may be the same or different), and a hydrolysis condensate thereof, b) an electromagnetic ray-curable compound or a partially cured electromagnetic ray-curable compound; and c) a silanol condensation catalyst.

Herein, specific examples of the substituents are the same as those of the compounds represented by the formulae (I) and (II) in the organic-inorganic hybrid material.

Although the organosilicon compound in the semi-cured material is a mixture of the compounds represented by the formulae (I) and (II), and the hydrolysis condensate thereof, usually, the organosilicon compound is mostly the hydrolysis condensate.

The composition of the organosilicon compound is as follows.

{[The compound of the formula (I)]+[a unit derived from the compound of the formula (I) in the hydrolysis condensate]}/{[the compound of the formula (I)]+[the compound of the formula (II)]+[a unit derived from the compound of the formula (I) in the hydrolysis condensate]+[a unit derived from the compound of the formula (II) in the hydrolysis condensate]}×100 is preferably 30 to 100 mol %, and more preferably 30 to 95 mol %.

{[The compound of the formula (II)]+[a unit, derived from the compound of the formula (II) in the hydrolysis condensate]}/{[the compound of the formula (I)]+[the compound of the formula (II)]+[a unit derived from the compound of the formula (I) in the hydrolysis condensate]+[a unit derived from the compound of the formula (II) in the hydrolysis condensate]}×100 is preferably 0 to 70 mol %, and more preferably 5 to 70 mol %.

Various materials can be applied as the substrate as long as the substrate has properties which can be used as a replica mold, such as heat resistance, mechanical strength, and solvent resistance. Examples thereof include metals such as nickel, stainless steel, aluminum, and copper; inorganic materials such as glass and ceramic; polyester-based resins such as polyethylene terephthalate and polyethylene naphthalate; polyamide-based resins such as nylon 6; polyolephin-based resins such as polyethylene, polypropylene, and polymethylpentene; vinyl-based resins such as polyvinyl chloride; acryl-based resins such as polymethacrylate and polymethyl methacrylate; styrene-based resins such as polycarbonate and high-impact polystyrene; cellulose film such as cellophane and cellulose acetate; and imide-based resins such as polyimide. A thickness of the substrate of about 10 to 5000 μm can be usually applied, and it is preferably 100 to 2000 μm.

The substrate may be a copolymer resin comprising these resins as main components, or may be a laminated body including a mixed body (including alloy) or a plurality of layers. The substrate may be a stretched film or a non-stretched film, while a film stretched to uniaxial direction or biaxial direction is preferred for the purpose of improving strength. The substrate is used as a film, sheet or board including at least one layer of these resins. A highly adhesive treatment such as corona discharge treatment, plasma treatment, ozone treatment, frame treatment, primer (anchor coat, adhesive promoter, also referred to as high adhesive) coating treatment, pre-heating treatment, dust exclusion treatment, deposition treatment, and alkali treatment may be performed to the coating surface before the coating. According to need, additives such as a filler, plasticizer, colorant, and antistat may be added.

The thickness of the semi-cured material layer of the organic-inorganic hybrid material on the substrate depends on its use, and preferably is 0.5 to 20 μm, particularly approximately 1 to 10 μm.

As long as it does not impair properties and functions of each layer, various additives such as an antistat, water repellent, oil repellent, stabilizer, conductor, and antifog agent can be added to each layer according to need.

4. Method for Forming Replica Mold

A method for forming a replica mold by an imprinting method will be specifically described. The method has the following steps:

first Step: a step of coating a substrate with an organic-inorganic hybrid material;

second Step: a step of semi-curing the coated surface with heat and/or an electromagnetic ray to produce a substrate for fine raised and depressed pattern formation;

third Step: a step of pressing a master mold having a predetermined fine raised and depressed pattern formed thereon against the substrate for fine raised and depressed pattern formation by an imprinting method to transfer the fine raised and depressed pattern onto the substrate; and fourth Step: a step of irradiating the substrate with an electromagnetic ray in a state where the master mold is removed from the substrate for fine raised and depressed pattern formation onto which the fine raised and depressed pattern is transferred or a state where the master mold is not removed, to cure the substrate.

The method may further comprise the step of applying a mold releasing layer to the surface of the fine raised and depressed pattern obtained in the fourth step as a fifth step. The organic-inorganic hybrid material may contain a material for the mold releasing layer without performing the fifth step.

(First Step)

The substrate can be coated with the organic-inorganic hybrid material of the present invention. Various known laminating methods can be used. For example, the organic-inorganic hybrid material can be formed by methods including microgravure coating, comma coating, barcoater coating, air knife coating, spin coating, dip coating, offset printing, flexo printing, screen printing, and spray coating.

(Second Step)

The fine raised and depressed pattern is formed on the substrate by coating the substrate with a solution containing an organic-inorganic hybrid material, and semi-curing it by heating and/or irradiating an electromagnetic ray. By this step, condensates of organosilicon compounds in the organic-inorganic hybrid material are crosslinked, and the organic-inorganic hybrid material layer is semi-cured. When an organic solvent is used as a diluent solvent, or the like, the organic solvent is removed by this heating. The heating is usually performed at 40 to 200° C., and preferably 50 to 150° C. A heating time is usually 10 seconds to 60 minutes, and preferably 30 seconds to 10 minutes.

(Third Step)

The substrate for fine raised and depressed pattern formation is deformed by pressing a master mold having a raised and depressed structure having a specific pattern against the substrate for fine raised and depressed pattern formation which is the semi-cured material of the organic-inorganic hybrid material laminated on the substrate. For example, the substrate is deformed by using a Si wafer mold having a specific line formed thereon by a hydraulic pressing machine.

The master mold can foe pressed by a known technique. The master mold is usually pressed at 20 to 200° C. for 30 seconds to 30 minutes.

The mold releasing layer may be previously provided by a method to be described later in order to improve a mold releasing characteristic of the master mold.

(Fourth Step)

The substrate for fine raised and depressed pattern formation is conventionally irradiated with the electromagnetic ray while the mold is pressed against the substrate. However, not only the method as usual but also a method for removing the mold from the substrate for fine raised and depressed pattern formation, and thereafter irradiating the substrate with the electromagnetic ray can be used in the present invention.

As for the electromagnetic ray, an ultraviolet ray, an X ray, a radioactive ray, an ionized radioactive ray, and an ionizing radioactive ray (α-, β-, γ-rays, neutron ray, electron ray) can foe used, and a light having a wavelength of 350 nm or less is preferred.

Irradiation with an active energy ray can be performed by using known devices including an extra high-pressure mercury lamp, high-pressure mercury lamp, low pressure mercury lamp, metal halide lamp, excimer lamp, carbon arc lamp, and xenon arc lamp. As a light source of irradiation, a light source comprising light having any wavelength of 150 to 350 nm is preferred, and a light, source comprising light, having any wavelength of 250 to 310 nm is more preferred.

As irradiation light volume of light to irradiate in order to sufficiently cure the organic-inorganic hybrid material layer in a semi-cured state, for example, a volume of approximately 0.1 to 100 J/cm$^2$ can be exemplified. In view of the film curing efficiency (relationship of irradiated energy and film curing level), the irradiation light volume is preferably approximately 1 to 10 J/cm$^2$, and more preferably approximately 1 to 5 J/cm$^2$.

The replica mold layer formed of the organic-inorganic hybrid material of the present invention has preferably a constitution wherein the carbon content of the surface part is less than the carbon content of the back side part, and it is more preferred that the carbon content of the surface part at 2 nm in the depth direction from the surface is 80% or less based on the carbon content of the back side part at 10 nm in the depth direction from the back side, and still more preferably 2 to 60%. Herein, the carbon content of the surface part being less than the carbon content of the back side part means that the total amount of carbon from the surface to the central part is less than the total amount of carbon from the back side to the central part.

(Fifth Step)

After the fourth step, the mold releasing layer can be applied onto the surface of the fine raised and depressed pattern. Although the mold releasing layer can be applied by coating the surface of the fine raised and depressed pattern with the material for the mold releasing layer, various known laminating methods can be used. For example, each layer can be formed by methods including microgravure coating, comma coating, barcoater coating, air knife coating, spin coating, dip coating, offset printing, flexo printing, screen printing, spray coating, a deposition method, and a sputter method.

Examples of the material of the mold releasing layer include a melamine resin, a silicone resin, a fluorocarbon resin, a cellulose derivative, a urea resin, a polyolefin resin, a paraffine resin, and a known release agents. One or two or more thereof can be used.

As described in WO2008-059840 pamphlet or the like, separately from the above conventional method, the replica mold is brought into contact with an organic solvent solution containing a metal-based surface-active agent having at least one or more hydrolyzable groups, a compound which can interact with the metal-based surface-active agent, and water. Thereby, an organic thin film, preferably a monomolecular film can be formed on a substrate, to provide the mold releasing layer.

The mold releasing layer can be also applied to the master mold.

On the other hand, examples of the material of the mold releasing layer which can be contained in order to form the mold releasing layer in the organic-inorganic hybrid material of the present invention without being performed as the fifth step include a compound having a hydrocarbon group having 10 to 30 carbon atoms, a compound having a hydrocarbon group having 10 to 30 carbon atoms in which three or more hydrogen atoms are substituted with fluorine atoms, a silicone resin such as polydimethylsiloxane, silica fine particles, and poly(tetrafluoroethylene) fine particles. Specific examples include silicone release agents KS-702, KS-705, KS-707, KF-54, KF-412, and KF-4701 (manufactured by Shin-Etsu Chemical Co., Ltd.), silicone release agents SH200 and FS1265 (manufactured by Toray-Dow Corning Corporation), Optool DAC (manufactured by Daikin Industries, Ltd.), and megafac series (manufactured by DIC Corporation).

As the metal-based surface-active agent having at least one or more hydrolyzable groups, a metal-based surface-active agent represented by the formula (IV) is preferred:

$$R^3{}_s MX_{t-s} \qquad (IV)$$

(wherein R$^3$ is a hydrocarbon group having 1 to 30 carbon atoms which may contain a substituent, a halogenated hydrocarbon group having 1 to 30 carbon atoms which may contain a substituent, a hydrocarbon group having 1 to 30 carbon atoms which contains a linkage group, or a halogenated hydrocarbon group having 1 to 30 carbon atoms which contains a linkage group; M represents at least one metal atom selected from the group consisting of a silicon atom, a germanium atom, a tin atom, a titanium atom, and a zirconium atom; X represents a hydroxyl group or a hydrolyzable group; t represents the atomic valence of M; s represents a positive integer from 1 to (t−1); in the case where s is 2 or greater, each R$^3$ may foe the same or different; and in the case where (t−s) is 2 or greater, each X may be the same or different, although at least one X group of the X groups is a hydrolyzable group).

Examples of the hydrocarbon group within the hydrocarbon group having 1 to 30 carbon atoms which may contain a substituent in the formula (IV) include alkyl groups such as a methyl group, ethyl group, n-propyl group, isopropyl group, n-butyl group, isobutyl group, sec-butyl group, t-butyl group, n-pentyl group, isopentyl group, neopentyl group, t-pentyl group, n-hexyl group, isohexyl group, n-heptyl group, n-octyl group, n-decyl group, or n-octadecyl group; alkenyl groups such as a vinyl group, propenyl group, butenyl group, pentenyl group, n-decynyl group, or n-octadecynyl group; and aryl groups such as a phenyl group, 1-naphthyl group, or 2-naphthyl group.

Examples of the halogenated hydrocarbon group within the halogenated hydrocarbon group having 1 to 30 carbon atoms which may contain a substituent include halogenated alkyl groups having 1 to 30 carbon atoms, halogenated alkenyl groups having 1 to 30 carbon atoms, and halogenated aryl groups having 1 to 30 carbon atoms. Of these, halogenated hydrocarbon groups in which two or more hydrogen atoms in an alkyl group having 1 to 30 carbon atoms are substituted with halogen atoms are preferred, and fluorinated alkyl groups in which two or more hydrogen atoms in an alkyl group having 1 to 30 carbon atoms are substituted with fluorine atoms are more preferable. In the case where the fluorinated alkyl group has a branched structure, the branched portions are short chains of 1 to 4 carbon atoms, and preferably 1 to 2 carbon atoms.

Specific examples of the hydrocarbon group within the hydrocarbon group containing a linkage group include the same groups listed above as the hydrocarbon group within the hydrocarbon group which may contain a substituent. Specific examples of the halogenated hydrocarbon group within the halogenated hydrocarbon group containing a linkage group include the same groups listed above as the halogenated hydrocarbon group within the halogenated hydrocarbon group which may contain a substituent.

The linkage group preferably exists either between a carbon-carbon bond of the hydrocarbon group or halogenated hydrocarbon group, or between a carbon atom of the hydrocarbon group and the metal atom M to be described later.

Specific examples of the linkage group include —O—, —S—, —SO$_2$—, —CO—, —C(=O)O—, or —C(=O)NR$^{51}$— (wherein, R$^{51}$ represents a hydrogen atom; or an alkyl group such as a methyl group, ethyl group, n-propyl group, or isopropyl group).

Of these, from the viewpoints of water repellency and durability, the R$^{51}$ is preferably an alkyl group having 1 to 30 carbon atoms, a fluorinated alkyl group having 1 to 30 carbon atoms, or a fluorinated alkyl group containing a linkage group.

X represents a hydroxyl group or a hydrolyzable group. There are no particular restrictions on the hydrolyzable group, provided it decomposes on reaction with water. Examples of the hydrolyzable group include alkoxy groups having 1 to 6 carbon atoms which may contain a substituent; acyloxy groups which may contain a substituent; halogen atoms such as a fluorine atom, chlorine atom, bromine atom, or iodine atom; an isocyanate group; cyano group; amino group; or amide group.

Examples of the alkoxy groups having 1 to 6 carbon atoms include a methoxy group, ethoxy group, n-propoxy group, isopropoxy group, n-butoxy group, sec-butoxy group, t-butoxy group, and n-pentyloxy group, and n-hexyloxy group. Examples of the acyloxy groups include an acetoxy group, propionyloxy group, n-propylcarbonyloxy group, isopropylcarbonyloxy group, and n-butylcarbonyloxy group. Examples of the substituent within these groups include a carboxyl group, amide group, imide group, ester group, or hydroxyl group. Of these, X is preferably a hydroxyl group, alkoxy group having 1 to 4 carbon atoms, acyloxy group, hydrogen atom, or isocyanate group. An alkoxy group having 1 to 4 carbon atoms or an acyloxy group is more preferred.

M represents an atom selected from the group consisting of a silicon atom, germanium atom, tin atom, titanium atom, and zirconium atom. Of these, from the viewpoints of an available raw material and reactivity, the silicon atom is preferred.

At least one compound selected from metal oxides; metal hydroxides; metal alkoxides; partial hydrolysis products of metal alkoxides; hydrolysis products of metal alkoxides; chelated or coordinated metal compounds; silanol condensation catalysts; and acid catalysts is used as the compound which can interact with the metal-based surface-active agent.

Specific examples of the metal oxide include methanol silica sol, IPA-ST, IPA-ST-UP, IPA-ST-ZL, NPC-ST-30, DMAC-ST, MEK-ST, MIBK-ST, XBA-ST, and PMA-ST (all of which are brand names of organosilica sols manufactured by Nissan Chemical Industries, Ltd.).

The metal hydroxides may be produced by any appropriate method, provided the product is a hydroxide of a metal. Examples of methods for producing the metal hydroxides include a method for hydrolyzing metal alkoxides to be described later, and a method for reacting a metal salt with a metal hydroxide. Commercially available metal hydroxides may also be purified and used if desired.

Examples of the metal alkoxides include silicon alkoxides such as Si(OCH$_3$)$_4$, Si(OC$_2$H$_5$)$_4$, Si(OC$_3$H$_7$-i)$_4$, and Si(OC$_4$H$_9$-t)$_4$; titanium alkoxides such as Ti(OCH$_3$)$_4$, Ti(OC$_2$H$_5$)$_4$, Ti(OC$_3$H$_7$-i)$_4$, and Ti(OC$_4$H$_9$)$_4$; tetrakistrialkylsiloxy titanium such as Ti[OSi(CH$_3$)$_3$]$_4$ and Ti[OSi(C$_2$H$_5$)$_3$]$_4$; zirconium alkoxides such as Zr(OCH$_3$)$_4$, Zr(OC$_2$H$_5$)$_4$, Zr(OC$_3$H$_7$)$_4$, and Zr(OC$_4$H$_9$)$_4$; aluminum alkoxides such as Al(OCH$_3$)$_4$, Al(OC$_2$H$_5$)$_4$, Al(OC$_3$H$_7$-i)$_4$, and Al(OC$_4$H$_9$)$_3$; germanium alkoxides such as Ge(OC$_2$H$_5$)$_4$; indium alkoxides such as In(OCH$_3$)$_3$, In(OC$_2$H$_5$)$_3$, In(OC$_3$H$_7$-i)$_3$, and In(OC$_4$H$_9$)$_3$; tin alkoxides such as Sn(OCH$_3$)$_4$, Sn(OC$_2$H$_5$)$_4$, Sn(OC$_3$H$_7$-i)$_4$, and Sn(OC$_4$H$_9$)$_4$; tantalum alkoxides such as Ta(OCH$_3$)$_5$, Ta(OC$_2$H$_5$)$_5$, Ta(OC$_3$H$_7$-i)$_5$, and Ta(OC$_4$H$_9$)$_5$; tungsten alkoxides such as W(OCH$_3$)$_6$, W(OC$_2$H$_5$)$_6$, W(OC$_3$H$_7$-i)$_6$, and W(OC$_4$H$_9$)$_6$; zinc alkoxides such as Zn(OC$_2$H$_5$)$_2$; and lead alkoxides such as Pb(OC$_4$H$_9$)$_4$. These alkoxides can be used alone or two or more kinds of them can be used in combination.

Partial hydrolysis products of metal alkoxides are obtained prior to complete hydrolysis of the metal alkoxides. Examples thereof include ones in the state of a metal oxide sol precursor or an oligomer.

Specific examples of the partial hydrolysis products of the metal alkoxides preferably include a dispersoid which is stably dispersed in an organic solvent without aggregating, in the absence of at least one kind selected from the group consisting of acids, bases, and dispersion stabilizers. In this case, the dispersoid refers to fine particles dispersed within the dispersion system. Specific examples thereof include colloidal particles. Herein, the phrase "stably dispersed without aggregating" means that, within the organic solvent, in the absence of acids, bases, and/or dispersion stabilizers, the hydrolysis product dispersoids do not aggregate or separate out to form a heterogeneous system, preferably form a transparent, homogeneous system. The term "transparent" means that the transmittance of visible light is high, and specifically, refers to a state wherein if the oxide-equivalent concentration of the dispersoid is set to 0.5% by weight, a quartz cell with an optical path length of 1 cm is used, an organic solvent is used as a comparative sample, and the measurements are conducted using light with a wavelength of 550 nm, then the spectral transmittance is preferably within a range from 80 to 100%. There are no particular restrictions on the particle diameter of the hydrolysis product dispersoid, although in order to achieve a high transmittance relative to visible light, the particle diameter is preferably within a range from 1 to 100 nm, more preferably from 1 to 50 nm, and still more preferably from 1 to 10 nm.

Examples of a method for producing a partial hydrolysis product of a metal alkoxide preferably include a method in which the metal alkoxide is hydrolyzed in an organic solvent, in the absence of acids, bases, and/or dispersion stabilizers, using from 0.5 to less than 2.0 mol of water based on the metal alkoxide, at a temperature within a range from −100° C. to the reflux temperature of the organic solvent.

The hydrolysis products of metal alkoxides used in the present invention are obtained by hydrolyzing the metal alkoxides by means of 2 molar equivalents or greater of water based on the metal alkoxides. The hydrolysis products may be obtained by hydrolyzing the metal alkoxides by means of 2 molar equivalents or greater of water based on the metal alkoxides, or may be obtained by partially hydrolyzing the metal alkoxides by means of less than 2 molar equivalents of water based on the metal alkoxides to obtain partial hydrolysis products of the metal alkoxides, and hydrolyzing the partial hydrolysis products by means of a predetermined amount of water (2 molar equivalents or greater of water based on the metal alkoxides in the total of the predetermined amount of water and the amount of the water used for the partial hydrolysis).

Chelated or coordinated metal compounds can be prepared by taking a solution of a metal compound, and then adding a chelating agent or coordination compound which is capable of forming a complex with the metal of the metal compound. There are no particular restrictions on the chelating agents or coordination compounds used, provided they are capable of chelating or coordinating the metal of metal hydroxides, metal alkoxides, or hydrolysis products obtained by treating metal alkoxides with water, thereby forming a complex.

Examples of the chelating agents or coordination compounds include saturated aliphatic carboxylic acids such as acetic acid, propionic acid, butyric acid, valeric acid, lauric acid, myristic acid, palmitic acid, and stearic acid; saturated aliphatic di carboxylic acids such as oxalic acid, malonic acid, succinic acid, glutaric acid, adipic acid, pimelic acid, suberic acid, azelaic acid, and sebacic acid; unsaturated carboxylic acids such as acrylic acid, methacrylic acid, crotonic acid, aleic acid, and maleic acid; aromatic carboxylic acids such as benzoic acid, toluic acid, and phthalic acid; halogenocarboxylic acids such as chloroacetic acid and trifluoroacetic acid; β-diketones such as acetylacetone, benzoylacetone, and hexafluoroacetylacetone; β-ketoesters such as methyl acetoacetate and ethyl acetoacetate; and heterocyclic compounds such as tetrahydrofuran, furan, furancarboxylic acid, thiophene, thiophenecarboxylic acid, pyridine, nicotinic acid, and isonicotinic acid. These compounds can be used alone or two or more kinds of them can be used in combination.

Examples of the silanol condensation catalysts include carboxylic acid metal salts, carboxylate metal salts, carboxylic acid metal salt, polymers, carboxylic acid metal salt chelates, titanate esters, and titanate ester chelates.

Specific examples thereof include stannous acetate, dibutyltin dilaurate, dibutyltin dioctate, dibutyltin diacetate, dioctyltin dilaurate, dioctyltin dioctate, dioctyltin diacetate, stannous dioctanoate, lead naphthenate, cobalt naphthenate, iron 2-ethylhexanoate, dioctyltin bisoctylthioglycolate, dioctyltin maleate, dibutyltin maleate polymer, dimethyltin mercaptopropionate polymer, dibutyltin bisacetylacetate, dioctyltin bisacetyllaurate, titanium tetraethoxide, titanium tetrabutoxide, titanium tetraisopropoxide, and titanium bis(acetylacetonyl)dipropoxide.

Examples of the acid catalysts include mineral acids such as hydrochloric acid, nitric acid, boric acid, and fluoroboric acid; organic acids such as acetic acid, formic acid, oxalic acid, carbonic acid, trifluoroacetic acid, p-toluenesulfonic acid, and methanesulfonic acid; and furthermore, photoacid generators which generate acid on irradiation particularly such as diphenyliodonium hexafluorophosphate and triphenylphosphonium hexafluorophosphate.

The content of water in the organic solvent solution for forming the mold releasing layer containing a metal-based surface-active agent having at least one or more hydrolyzable groups, a compound which can interact with the metal-based surface-active agent, and water is preferably 10 ppm to 2000 ppm. Examples of a method for adjusting or holding a moisture content within a range of a predetermined amount include (i) a method for providing a water layer in contact with the organic solvent solution for forming the mold releasing layer, (ii) a method for making a water retaining material containing moisture coexist, and (iii) a method for blowing gas containing moisture.

The organic solvent solution can be prepared by the method described in WO 2008/059840 pamphlet and the like. An organic thin film can be provided on a surface of a cured sheet for fine raised and depressed pattern formation, by bringing the organic solvent solution into contact with the sheet for fine raised and depressed pattern formation by means of dipping methods, spin coating methods, spray methods, roller coating methods, Meyer bar methods, screen printing methods, and brush coating methods, and preferably, dipping methods.

In the following, the present invention will be described by referring to Examples, while the technical scope of the present, invention will not be limited thereto.

Example 1

1 Preparation of Organic-Inorganic Hybrid Material for Producing Replica Mold 103.39 g of titanium diisopropoxybisacetylacetonate (manufactured by Nippon Soda Co., Ltd.; T-50; solid content in terms of titanium oxide: 16.5% by weight) was dissolved into 199.32 g of a mixed solvent of ethanol/ethyl acetate (=50/50: % by weight). 38.47 g of ion-exchange water (10-fold mol/mol of titanium oxide) was then slowly dropped by stirring. Then, a solution [A-1] was obtained by stirring for 24 hours.

As an organosilicon compound, a solution [C-1] wherein 199.36 g of vinyltrimethoxysilane [B-1] (manufactured by Shin-Etsu Chemical Co., Ltd.; KBM-1003) was mixed with 143.21 g of 3-methacryloxypropyltrimethoxysilane [B-2] (manufactured by Shin-Etsu Chemical Co., Ltd.; KBM-503) was used. The solution [C-1] and 341.17 g of the solution [A-1] were mixed. Further, 69.24 g of ion-exchange water was added thereto, and then stirred for 24 hours, to obtain 752.99 g of a solution [D-1].

As an electromagnetic ray-curable compound, 97.25 g of a urethane acrylate oligomer (manufactured by Nippon Synthetic Chemical Industry Co., Ltd.; ultraviolet UV7600B) was dissolved into 145.88 g of a mixed solvent of ethanol/ethyl acetate (=50/50: % by weight) so that it becomes 40% by weight. To this resultant solution, 3.39 g of Irgacure 127 (manufactured by Ciba Specialty Chemicals) was dissolved as a photopolymerization initiator, to produce a solution [E-1].

752.99 g of the solution [D-1] and 247.02 g of the solution [E-1] were mixed so that the solid content ratio becomes 70% by weight/30% by weight=[D-1]/[E-1], to produce an organic-inorganic hybrid material [F-1].

2 Production of Replica Mold Pattern

A 5 μm L/S silicon mold and a 5 μm dot silicon mold manufactured by Kyodo International, Inc. were used as a master mold in order to produce a replica mold. The master mold was previously immersed in an organic solvent solution SAMLAY (registered trademark) (manufactured by Nippon Soda Co., Ltd.) for forming an organic thin film made of a silica-based surface-active agent to apply a mold releasing characteristic.

Slide glass and a polycarbonate film were coated to a thickness of 5 μm with the organic-inorganic hybrid material [F-1] for producing the replica mold prepared by the method by a dip method, and were then heated at 100° C. for 10 minutes.

Next, the master molds (two types of the 5 µm L/S silicon mold and the 5 µm dot silicon mold) were put on the organic-inorganic hybrid material applied onto the slide glass. The master molds were pressed at a pressure of 2 MPa at 90° C. for 2 minutes using a hot press machine (manufactured by Imoto Machinary Co., Ltd., IMC-180C). After the master molds were removed, the surface of the organic-inorganic hybrid material was observed by a digital microscope. Excellent, transfer of 5 µm L/S and 5 µm dot could be confirmed. The photograph obtained by the digital microscope is shown in FIG. 1.

Figure 2:
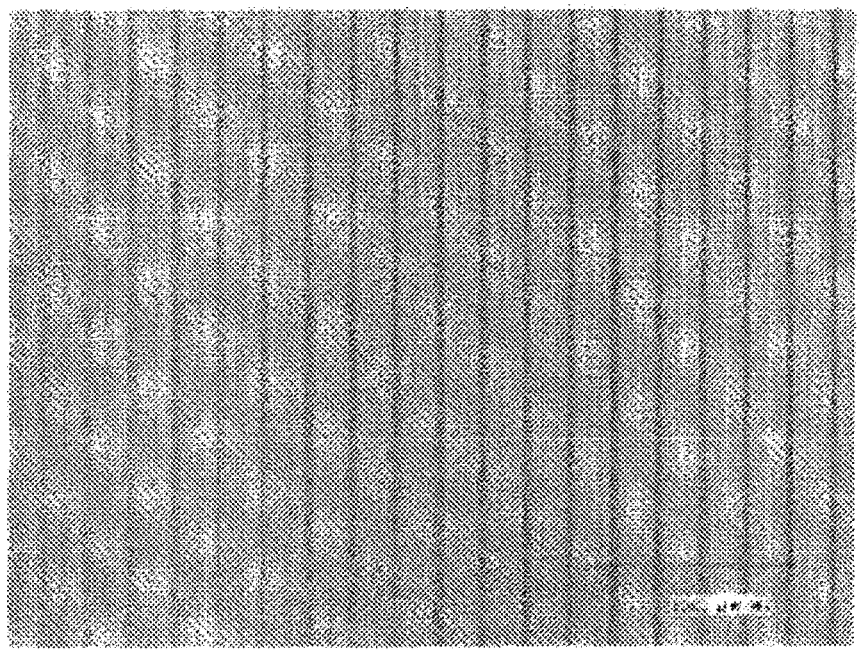
FIG. 2 is a photograph obtained by photographing a polycarbonate surface with an organic-inorganic hybrid material according to the present invention after pressing and removing a master mold, by means of a digital microscope in Example 1.

Then, the master mold (5 µm L/S silicon mold) was put on the organic-inorganic hybrid material applied onto the polycarbonate film, and was pressed at 27° C. at a pressure of 7 MPa for 2 minutes. After the master mold was removed, the surface of the organic-inorganic hybrid material was observed by the digital microscope. Excellent transfer of 5 µm L/S could be confirmed. The photograph obtained by the digital microscope is shown in FIG. 2.

3 UV Coring of Replica Mold and Application of Mold Releasing Layer

The substrate with the organic-inorganic hybrid material on which the pattern was formed was UV-cured at about 1200 mJ using a UV irradiation machine.

Then, after the substrate with the cured organic-inorganic hybrid material was subjected to UV ozone treatment for 10 minutes, the slide glass with the organic-inorganic hybrid material was immersed in the organic solvent solution SAMLAY (registered trademark) (manufactured by Nippon Soda Co., Ltd.) for forming the organic thin film containing the silica-based surface-active agent for 10 minutes, and the polycarbonate film with the organic-inorganic hybrid material was immersed in the solution for 3 minutes. After the slide glass and the polycarbonate film were pulled up from the solution, the slide glass and the polycarbonate film were washed in NS Clean 100 (manufactured by Japan Energy Corporation), and were dried to produce a mold releasing layer.

As a result, in both the case of the slide glass with the organic-inorganic hybrid material and the case of the polycarbonate film with the organic-inorganic hybrid material, a contact angle between the surface of the organic-inorganic hybrid material and water was equal to or greater than 100 degrees. It could be confirmed that the organic thin film mold releasing layer is formed.

4 Heat and Optical Imprints by Replica Mold 4-1 Heat Imprint

First, the replica molds (two types of the 5 µm L/S silicon mold and the 5 µm dot silicon mold) made of the slide glass with the organic-inorganic hybrid material to which the mold releasing layer was applied were pressed against soft acrylic (polymethyl methacrylate resin manufactured by CRD Corporation, thickness: 0.3 mm, Tg: 94° C.), and were pressed at a pressure of 8 MPa at 130° C. for 2 minutes to perform imprint.

Figure 3:
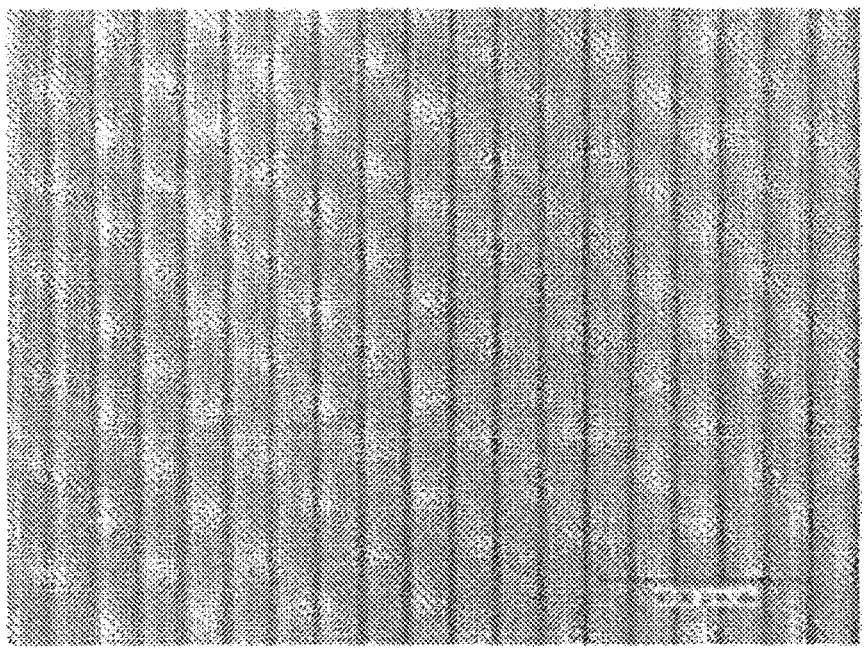
FIG. 3 is a photograph obtained by photographing a surface of a substrate after pressing a slide glass replica mold with an organic-inorganic hybrid material according to the present invention against the substrate, and removing the replica mold after a heat imprint, by means of a digital microscope in Example 1.

Then, the replica mold could be easily peeled without the use of power, and the surface of the soft acrylic was observed by the digital microscope. Excellent transfer of 5 µm L/S and dot could be confirmed. The photograph obtained by the digital microscope is shown in FIG. 3.

An area where a pattern was transferred in the slide glass with the organic-inorganic hybrid material to which the mold releasing layer was applied was larger than that in the slide glass with the organic-inorganic hybrid material to which the mold releasing layer was not applied after UV-curing in the item 3.

Then, the polycarbonate replica mold (5 µm L/S silicon mold) with the organic-inorganic hybrid material to which the mold releasing layer was applied was pressed against the soft acrylic, and was pressed at a pressure of 8 MPa at 130° C. for 2 minutes to perform imprint.

Figure 4:
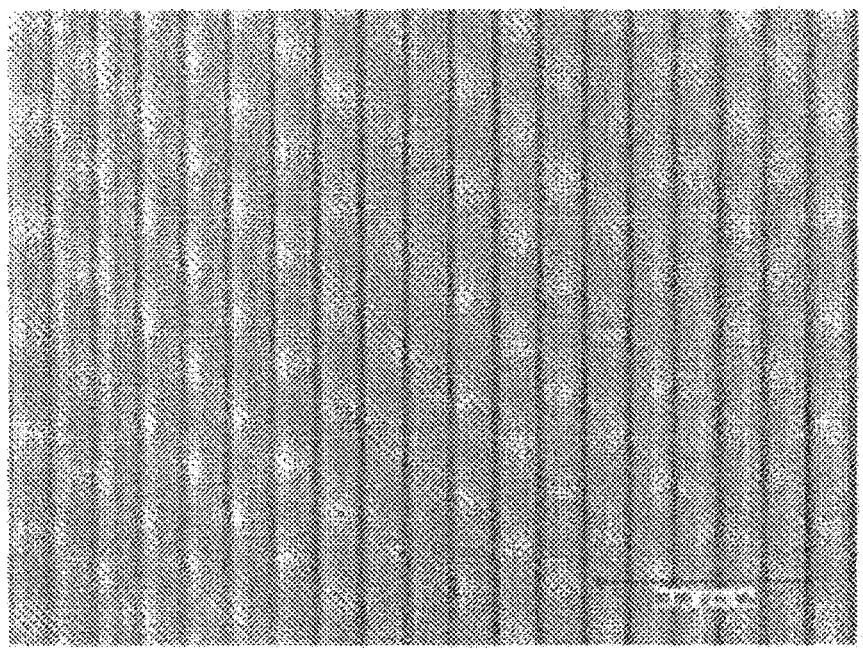
FIG. 4 is a photograph obtained by photographing a surface of a substrate after pressing a polycarbonate replica mold with an organic-inorganic hybrid material according to the present invention against the substrate, and removing the replica mold after a heat imprint, by means of a digital microscope in Example 1.

Then, the replica mold with the organic-inorganic hybrid material was peeled, and the surface of the soft acrylic was observed by the digital microscope. Excellent transfer of 5 µm L/S and dot was confirmed. The photograph obtained by the digital microscope is shown in FIG. 4.

4-2 Optical Imprint

PAK-01 (nanoimprint resin manufactured by Toyo Gosei Co., Ltd.; a mixture of radically curing acrylic resins, or the like) was cast on the PET film. The replica molds (two types of the 5 µm L/S silicon mold and the 5 µm dot silicon mold) made of the slide glass with the organic-inorganic hybrid material to which the mold releasing layer was applied were pressed against it, and were irradiated with black light for 20 seconds.

Figure 5:
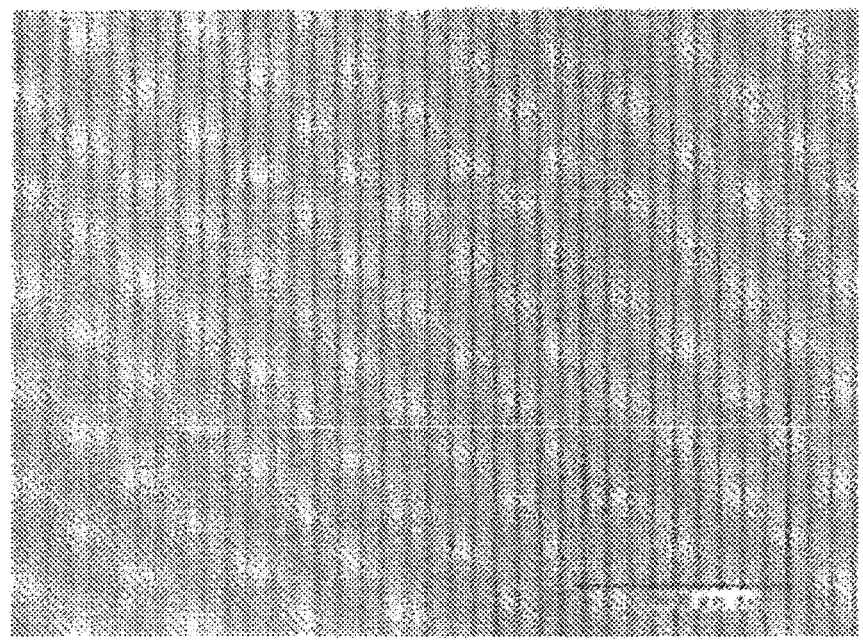
FIG. 5 is a photograph obtained by photographing a surface of a substrate after pressing a slide glass replica mold with an organic-inorganic hybrid material according to the present invention against the substrate, and removing the replica mold after an optical imprint, by means of a digital microscope in Example 1.

Then, the replica mold was peeled, and the film surface was observed by the digital microscope. Excellent transfer of 5 µm L/S and dot could be confirmed. The photograph obtained by the digital microscope is shown in FIG. 5.

The transfer rate of the pattern in the replica mold made of the slide glass with the organic-inorganic hybrid material to which the mold releasing layer was applied was higher than that in the slide glass with the organic-inorganic hybrid material to which the mold releasing layer was not applied after UV-curing in the item 3, and thereby the replica mold was easily peeled.

Example 2

1 Preparation of Organic-Inorganic Hybrid Material for Producing Replica Mold 119.7 g of titanium diisopropoxybisacetylacetonate (manufactured by Nippon Soda Co., Ltd.; T-50; solid content in terms of titanium oxide: 16.5% by weight) was dissolved into 230.7 g of methyl isobutyl ketone to produce a solution [A-2]. As an organosilicon compound, a solution [C-2] (vinyltrimethoxysilane/3-methacryloxypropyltrimethoxysilane=70/30: molar ratio) wherein 230.7 g of vinyltrimethoxysilane [B-1] (manufactured by Shin-Etsu Chemical Co., Ltd.; KBM-1003) was mixed with 165.7 g of 3-methacryloxypropyltrimethoxysilane [B-2] (manufactured by Shin-Etsu Chemical Co., Ltd.; KBM-503) was used. 350.4 g of the solution [A-2] and 396.4 g of the solution [C-2] were mixed so that an element ratio (Ti/Si=1/9) was set. Further, 84.59 g (1 molar time/number of moles of organosilicon compound) of ion-exchange water was added thereto, and then stirred for 12 hours, to produce a solution [D-2].

As an electromagnetic ray-curable compound, 93.8 g of a urethane acrylate oligomer A (manufactured by Negami Chemical Industrial Co., Ltd.; UN-952) and 70.34 g of a urethane acrylate oligomer B (Negami Chemical Industrial Co., Ltd.; UN-904M) were added and mixed. To this resultant solution, 2-methyl-1[4-(methylthio)phenyl]-2-morpholinopropane-1-one (manufactured by Ciba Specialty Chemicals, Irgacure 907) was dissolved so that the solid content ratio becomes 4% by weight, based on the solid content of the urethane acrylate oligomer as a photopolymerization initiator, to produce a solution [E-2]. The solution [E-2] and 831.4 g of the solution [D-2] were mixed, to produce an organic-inorganic hybrid material [F-2].

2 Production of Replica Mold Pattern

Figure 6:
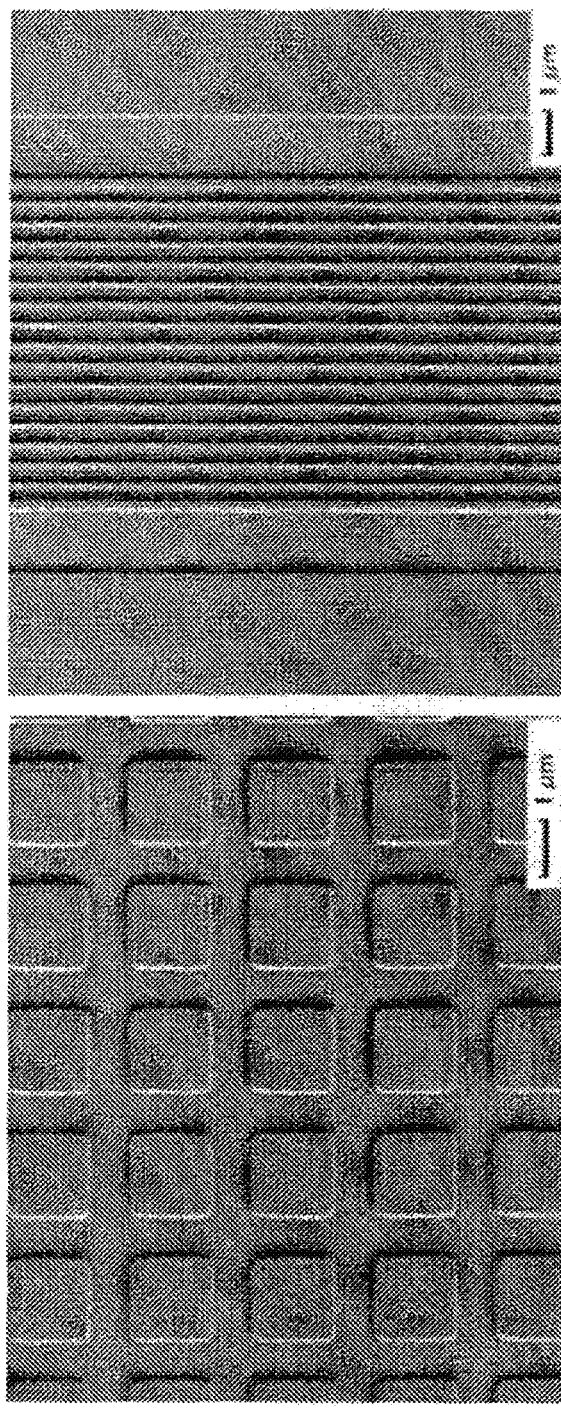
FIG. 6 is a photograph obtained by photographing a surface of a silicon mold used as a master mold, by means of a scanning electron microscope (SEM) in Example 2.

A silicon mold (pattern height: 110 nm) having a block pattern having a side of 1.5 μm and a silicon mold (pattern height: 110 nm) having a 110 nm L/S pattern were used as a master mold in order to produce a replica mold (FIG. 6). The master mold was previously immersed in an organic solvent solution SAMLAY (registered trademark) (manufactured by Nippon Soda Co., Ltd.) for forming an organic thin film made of a silica-based surface-active agent to apply a mold releasing characteristic.

Slide glass and a PET film were coated to a thickness of 3 μm with the organic-inorganic hybrid material [F-2] for producing the replica mold prepared by the method by a bar coat method, and were heated at 100° C. for 10 minutes.

Figure 7:
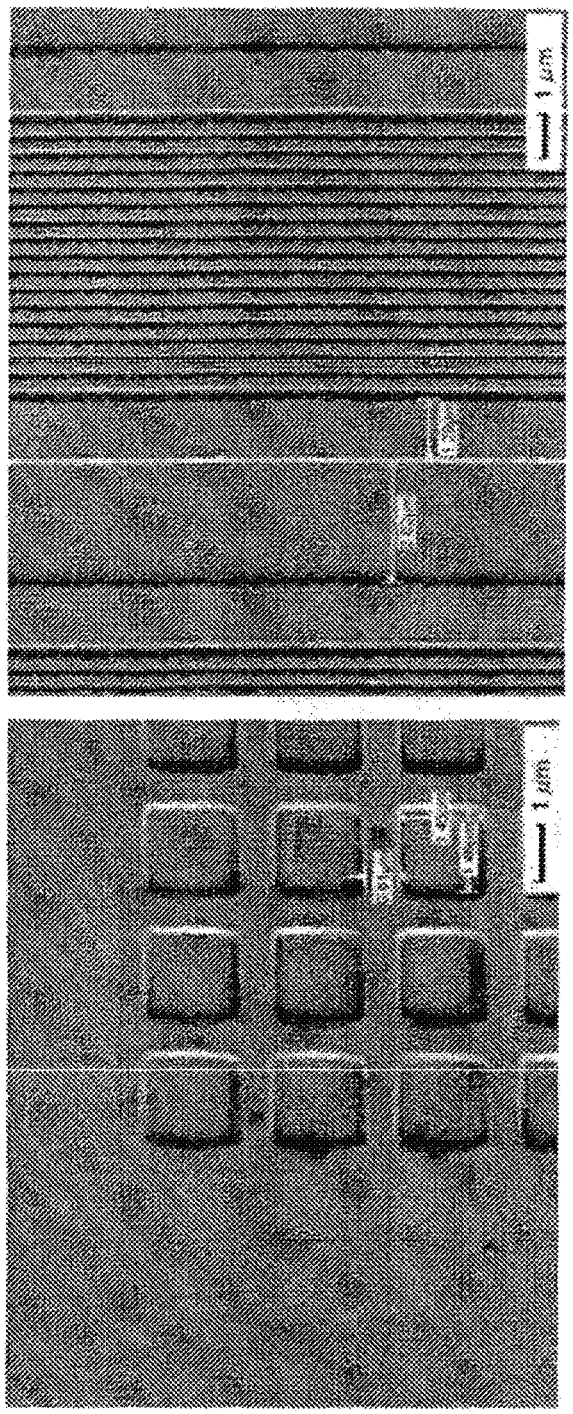
FIG. 7 is a photograph obtained by putting and pressing a master mold on a slide glass with an organic-inorganic hybrid material of the present invention, and photographing the surface of the mold by an SEM after a neat imprint in Example 2.

Next, the master molds (two types of the 1.5 μm block silicon mold and the 110 nm L/S silicon mold) were put on the organic-inorganic hybrid material applied onto the slide glass. The master molds were pressed at a pressure of 3 kN at 120° C. for 2 minutes using a nanoimprint device (manufactured by Meisyo Kiko Co., Ltd., NANOIMPRINTER). After the master molds were removed, the surface of the organic-inorganic hybrid material was observed by a scanning electron microscope (SEM). Excellent transfer of 1.5 μm block and 110 nm L/S could be confirmed. The photograph obtained by the SEM is shown in FIG. 7.

Then, the master molds (the 1.5 μm block silicon mold and the 110 nm L/S silicon mold) were put on the organic-inorganic hybrid material applied onto the PET film, and were pressed at a pressure of 3 kN at 100° C. for 3 minutes. After the master molds were removed, the surface of the organic-inorganic hybrid material was observed. Excellent transfer of 1.5 μm block and 110 nm L/S could be confirmed.

3 UV Curing of Replica Mold and Application of Mold Releasing Layer

The substrate with the organic-inorganic hybrid material on which the pattern was formed was UV-cured at about 2000 mJ using a UV irradiation machine.

Then, after the substrate with the cured organic-inorganic hybrid material was subjected to UV ozone treatment for 10 minutes, the substrate with the organic-inorganic hybrid material was immersed in a fluorine-based surface-treating agent Novec EGC-1720 (manufactured by Sumitomo 3M Ltd.) for 3 minutes. After the substrate was pulled up from the solution, the substrate was washed in HFE-7200 (manufactured by Sumitomo 3M Ltd.) and was dried to produce a mold releasing layer.

As a result, in both the cases of the slide glass with the organic-inorganic hybrid material and the PET film with the organic-inorganic hybrid material, a contact angle between the surface of the organic-inorganic hybrid material and water was equal to or greater than 100 degrees. It could be confirmed that, the mold releasing layer is formed.

4 Optical Imprints by Replica Mold

PAK-01 (nanoimprint resin manufactured by Toyo Gosei Co., Ltd.) was cast on the PET film. The replica molds (two types of the 1.5 μm block silicon mold and the 110 nm L/S silicon mold) made of the PET film with the organic-inorganic hybrid material to which Novec EGC-1720 was applied as the mold releasing layer was pressed thereto, and was irradiated by a high-pressure mercury lamp for 10 seconds.

Figure 8:
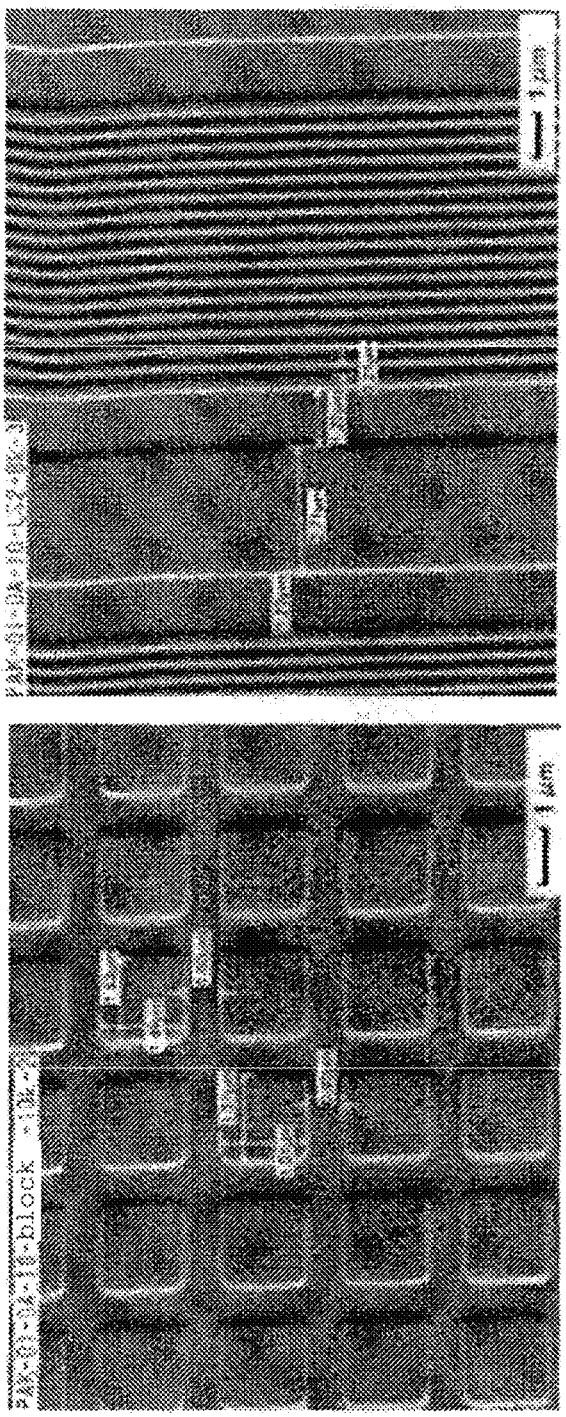
FIG. 8 is a photograph obtained by pressing a replica mold made of a PET film with an organic-inorganic hybrid material of the present invention against a substrate and photographing a surface of the substrate by an SEM after removing the replica mold after an optical imprint in Example 2.

Then, the replica mold was peeled, and the film surface was observed by the SEM. Excellent transfer of 1.5 μm block and 110 nm L/S could foe confirmed. The photograph obtained by the SEM is shown in FIG. 8.

Example 3

1 Preparation of Organic-Inorganic Hybrid Material for Producing Replica Mold

The organic-inorganic hybrid material [F-1] prepared in Example 1 was used.

2 Production of Replica Mold Pattern

A nickel electrotyping mold having an antireflection structure manufactured by NIL Technology Company was used as a master mold in order to produce a replica mold. The master mold was previously processed in an organic solvent solution SAMLAY (registered trademark) (manufactured by Nippon Soda Co., Ltd.) for forming an organic thin film made of a silica-based surface-active agent to apply a mold releasing characteristic.

A PET film (manufactured by Toyobo Co., Ltd., Cosmo Shine A4100, thickness: 100 μm) was coated to a thickness of 5 μm with the organic-inorganic hybrid material [F-1] for producing the replica mold prepared in Example 1 by a microgravure coater (manufactured by Yasui Seiki Co., Ltd.), and was heated and dried at 150° C.

Figure 9:
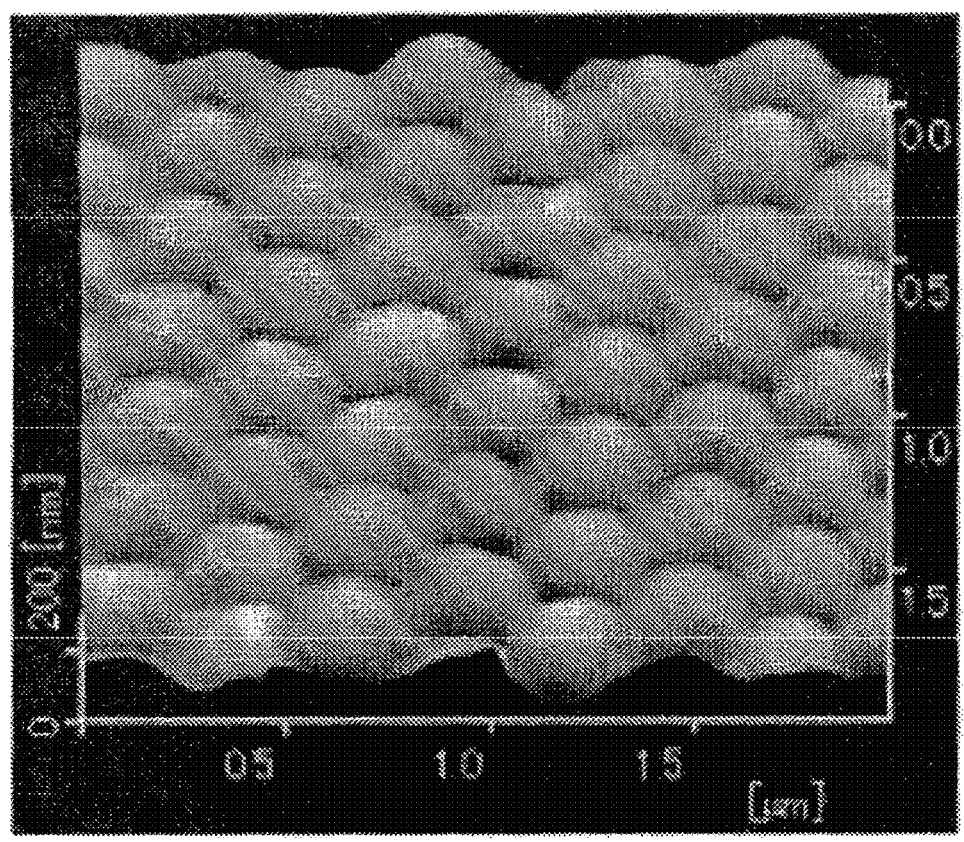
FIG. 9 is a photograph obtained by pressing a master mold at a pressure of 4 MPa at 60° C. for 3 minutes and photographing a surface of a PET film (I) with an organic-inorganic hybrid material according to the present invention after removing the master mold by an AFM in Example 3.

Next, the master mold was put on the organic-inorganic hybrid material applied onto the PET film. The master mold was pressed at a pressure of 4 MPa at 60° C. for 3 minutes using a nanoimprint device (manufactured by Meisyo Kiko Co., Ltd., NANOIMPRINTER) (the obtained PET film is referred to as "a PET film (I) with an organic-inorganic hybrid material"). After the master mold was removed, the surface of the organic-inorganic hybrid material was observed by an AFM (manufactured by SII nanotechnology Company, SPI-3800N, SPA400 unit). Excellent transfer of 250 nm pitch pattern could be confirmed. The shape image (observation area: 2 μm square) of the AFM is shown in FIG. 9.

Figure 10:
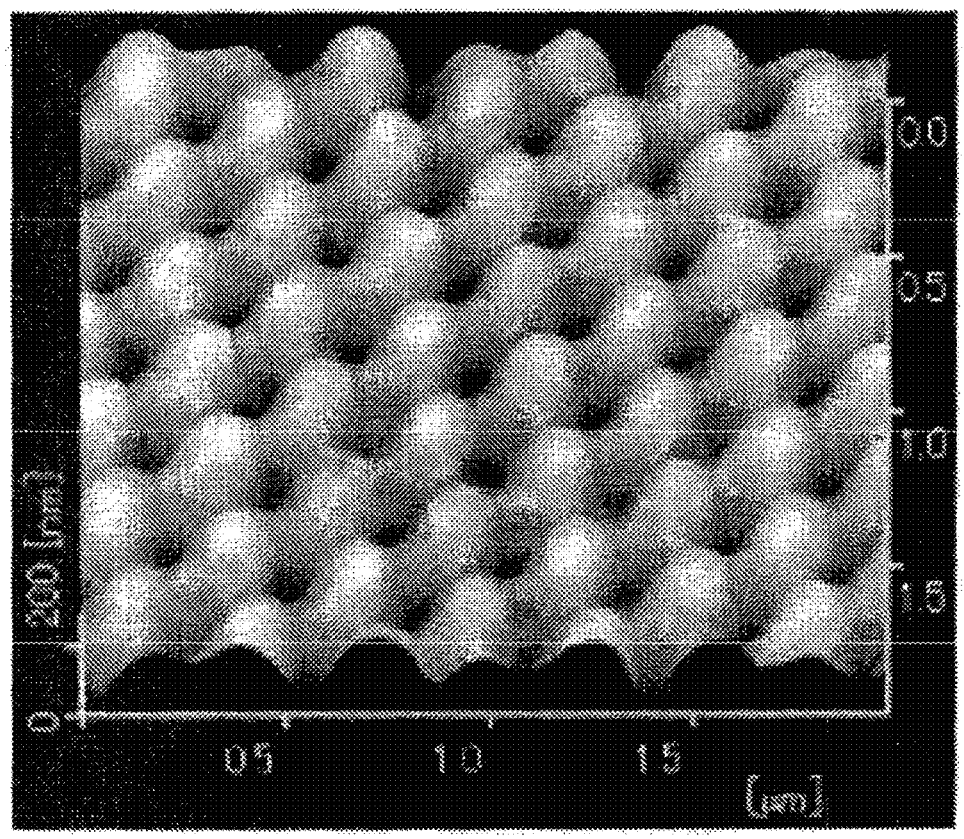
FIG. 10 is a photograph obtained by pressing a master mold at a pressure of 12 MPa at 100° C. for 3 minutes and photographing a surface of a PET film (II) with an organic-inorganic hybrid material according to the present invention after removing the master mold by an AFM in Example 3.

Then, the master mold was put on the organic-inorganic hybrid material applied onto the PET film, and was pressed at 100° C. at a pressure of 12 MPa for 3 minutes (the obtained PET film is referred to as "a PET film (II) with an organic-inorganic hybrid material"). After the master mold was removed, the surface of the organic-inorganic hybrid material was observed by the AFM. Excellent transfer of 250 nm pitch pattern could be confirmed. The shape image (observation area: 2 μm square) of the AFM is shown in FIG. 10.

3 UV Coring of Replica Mold and Application of Mold Releasing Layer

The PET films (I) and (II) with the organic-inorganic hybrid material on which the pattern was formed were UV-cured at about 2000 mJ/cm$^2$ using a UV irradiation machine.

Then, after the PET films (I) and (II) with the cured organic-inorganic hybrid material were subjected to UV ozone treatment for 10 minutes, the PET films (I) and (II) were immersed in the organic solvent solution SAMLAY (registered trademark) (manufactured by Nippon Soda Co., Ltd.) for forming the organic thin film containing the silica-based surface-active agent for 10 minutes. After the PET films (I) and (II) were pulled up from the solution, the PET films (I) and (II) were washed in NS clean 100 (manufactured by Japan Energy Corporation) and were dried to produce a mold releasing layer.

As a result, a contact angle between the surface of the organic-inorganic hybrid material and wafer was equal to or greater than 100 degrees. It could be confirmed that the organic thin film mold releasing layer is formed.

As described above, the replica mold (I) was obtained from the PET film (I), and the replica mold (II) was obtained from the PET film (II).

4 Heat and Optical Imprints by Replica Mold 4-1 Heat Imprint

First, the replica mold (II) (250 nm pitch pattern) made of the PET film with the organic-inorganic hybrid material to which the mold releasing layer was applied was put on a polymethyl methacrylate resin plate (Clarex manufactured by Nitto Jushi Kogyo Co., Ltd., thickness: 0.5 mm, Tg: 120° C.), and was pressed at a pressure of 10 MPa at 135° C. for 3 minutes using a nano imprint device to perform imprint. After the imprinted resin plate and replica mold were cooled to 60° C., the mold was released.

Figure 11:
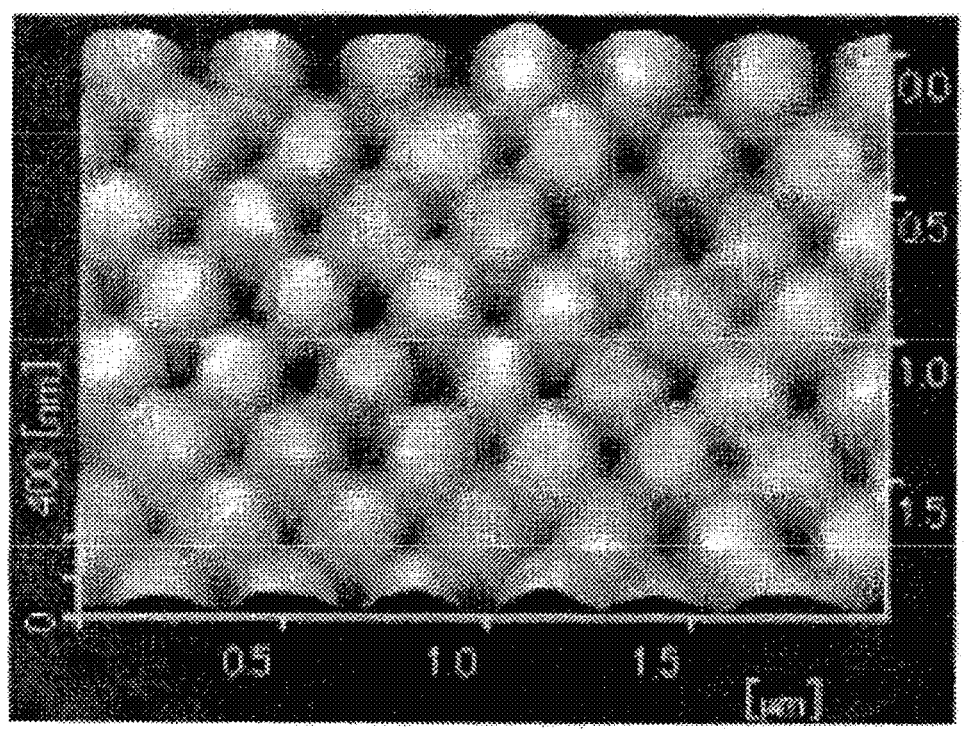
FIG. 11 is a photograph obtained by pressing a replica mold (II) according to the present invention obtained by UV-curing a PET film (II) with an organic-inorganic hybrid material against a substrate (polymethyl methacrylate resin) and photographing a surface of the substrate after removing the replica mold by an AFM after a heat imprint in Example 3.

The replica mold could be easily peeled without the use of power, and the surface of the polymethyl methacrylate resin was observed by the AFM. Excellent transfer of 250 nm pitch pattern could be confirmed. The shape image (observation area: 2 μm square) of the AFM is shown in FIG. 11.

Then, the replica mold (II) (250 nm pitch pattern) made of the PET film with the organic-inorganic hybrid material to which the mold releasing layer was applied was pressed against a polycycloolefin resin plate (ZEONOR manufactured by Zeon Corporation, thickness: 1 mm, Tg: 100° C.) at 135° C. at a pressure of 10 MPa for 3 minutes to perform imprint. After the imprinted resin plate and replica mold were cooled to 60° C., the mold was released.

Figure 12:
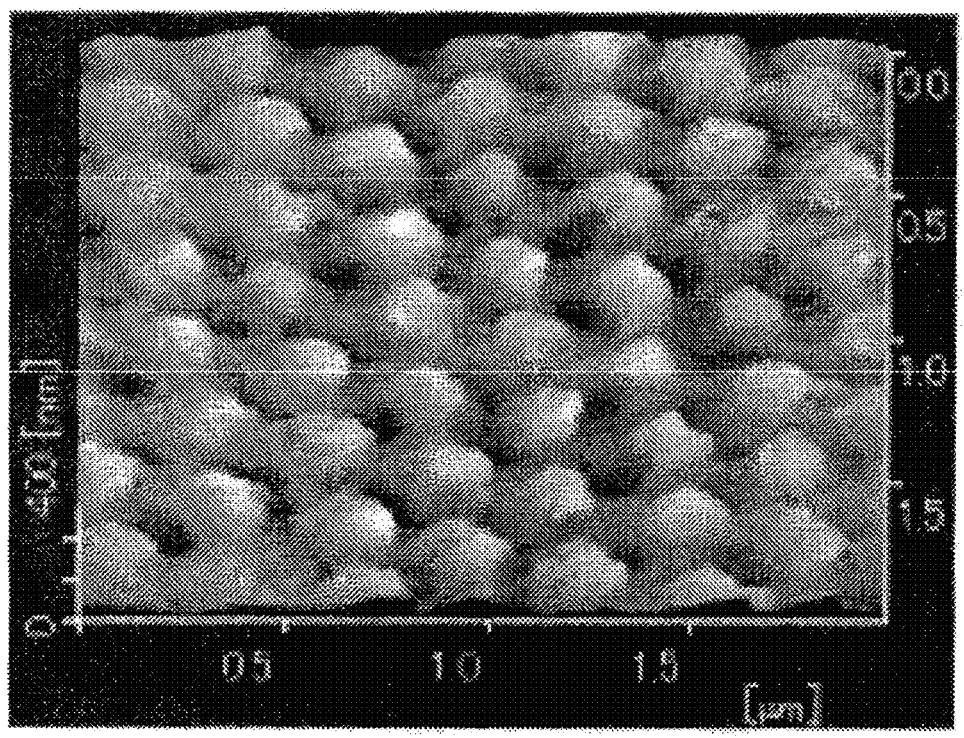
FIG. 12 is a photograph obtained by pressing a replica mold (II) according to the present invention obtained by UV-curing a PET film (II) with an organic-inorganic hybrid material against a substrate (polycycloolefin resin) and photographing a surface of the substrate after removing the replica mold by an AFM after a heat imprint in Example 3.

The replica mold could be easily peeled without the use of power, and the polycycloolefin resin was observed by the AFM. Excellent transfer of 250 nm pitch pattern could be confirmed. The shape image (observation area: 2 μm square) of the AFM is shown in FIG. 12.

4-2 Optical Imprint

PAK-01 (nanoimprint resin manufactured by Toyo Gosei Co., Ltd.; a mixture of radically curing acrylic resins) was cast on slide glass. The replica mold (II) (250 nm pitch pattern) made of the PET film with the organic-inorganic hybrid material to which the mold releasing layer was applied was put thereon, and was irradiated with UV light at 700 mJ/cm$^2$ at 25° C. using the nanoimprint device.

Figure 13:
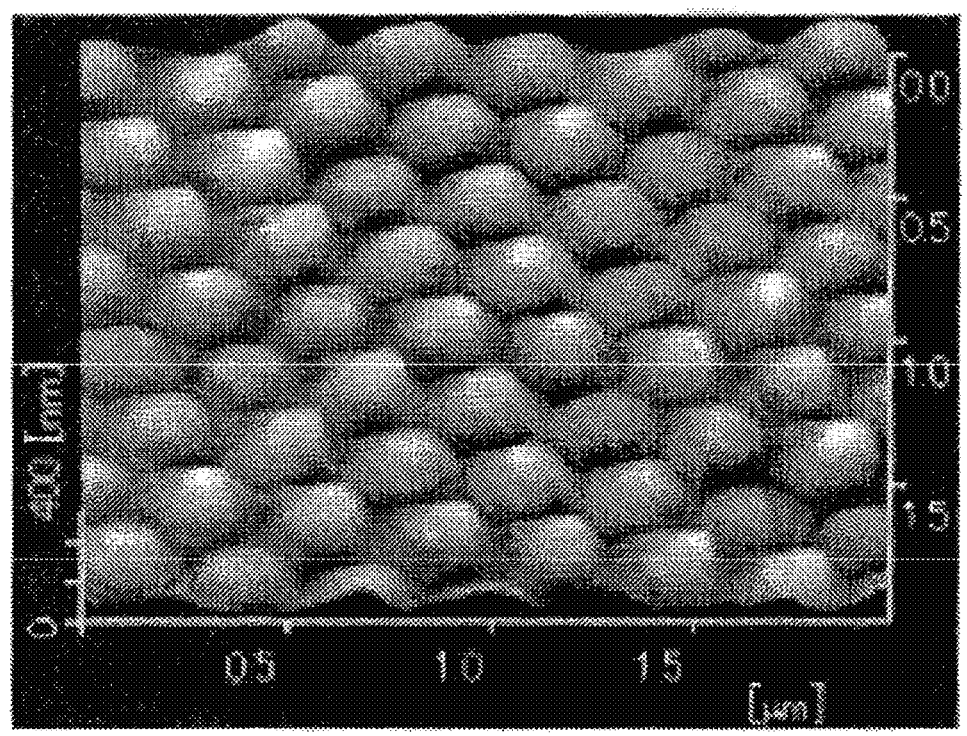
FIG. 13 is a photograph obtained by pressing a replica mold (II) according to the present invention obtained by UV-curing a PET film (II) with an organic-inorganic hybrid material against a substrate and photographing a surface of the substrate after removing the replica mold by an AFM after an optical imprint (700 mJ/cm$^2$) in Example 3.

Then, the replica mold was peeled, and the surface of the slide glass was observed by the AFM. Excellent transfer of 250 nm pitch pattern could be confirmed. The shape image (observation area: 2 μm square) of the AFM is shown in FIG. 13.

Then, PAK-01 was cast on the slide glass. The replica mold (II) (250 nm pitch pattern) made of the PET film with the organic-inorganic hybrid material to which the mold releasing layer was applied was put thereon, and was irradiated with UV light at 1500 mJ/cm$^2$ at 25° C. using the nanoimprint device.

Figure 14:
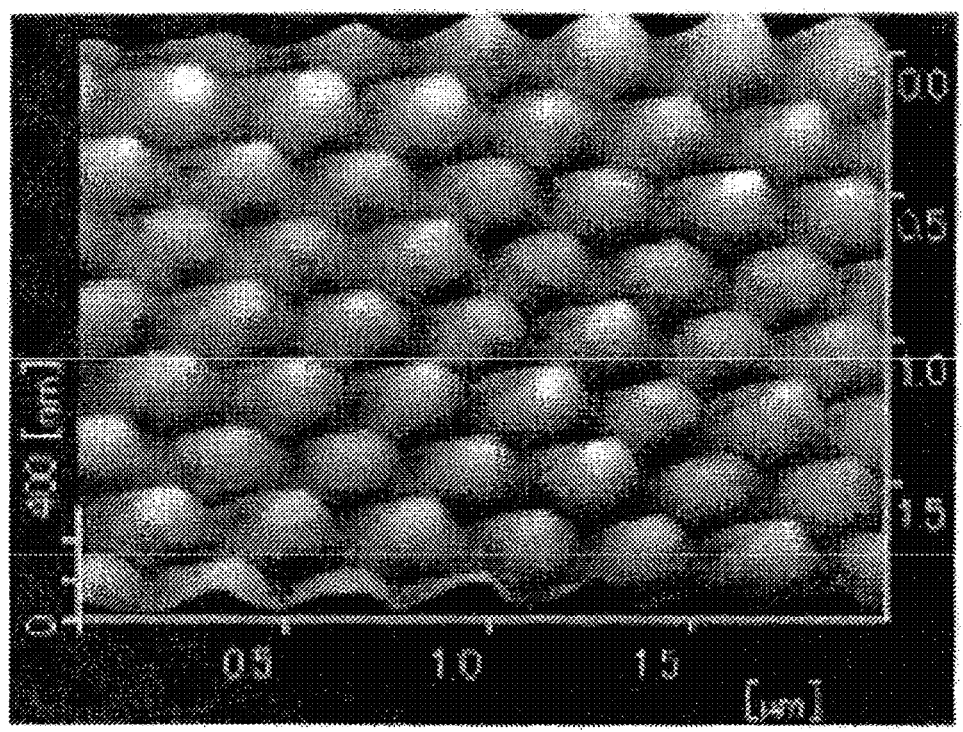
FIG. 14 is a photograph obtained by pressing a replica mold (II) according to the present invention obtained by UV-curing a PET film (II) with an organic-inorganic hybrid material against a substrate and photographing a surface of the substrate after removing the replica mold by an AFM after an optical imprint (1500 mJ/cm²) in Example 3.

Then, the replica mold was peeled, and the surface of the slide glass was observed by the AFM. Excellent transfer of 250 nm pitch pattern could be confirmed. The shape image (observation area: 2 μm square) of the AFM is shown in FIG. 14.

INDUSTRIAL APPLICABILITY

When the organic-inorganic hybrid material of the present invention is used to produce the fine raised and depressed pattern by the imprinting method, the organic-inorganic hybrid material has excellent storage stability before use, and the fine raised and depressed pattern having a certain extent of flexibility can be formed. Because the surface is mineralized with the fine raised and depressed pattern maintained after being cured, and the surface has a significantly high hardness, the surface has excellent abrasion resistance.

After the master mold is pressed, the electromagnetic ray can be irradiated without removing the master mold as before by coating the substrate with the organic-inorganic hybrid material of the present invention and semi-curing it. However, even if the master mold is removed, the electromagnetic ray can be irradiated. Therefore, it becomes unnecessary to use the substrate or master mold transmitting electromagnetic waves required when the electromagnetic waves are irradiated in a state where the master mold is pressed unlike the case of usual optical imprint. An inexpensive mold material can be used. The material of the substrate may be optional, and the production cost can be drastically reduced.

The invention claimed is:

1. A method for producing a replica mold comprising the steps of:
   (A) coating a surface of a substrate with an organic-inorganic hybrid material to form an organic-inorganic hybrid material layer;
   (B) semi-curing the organic-inorganic hybrid material layer with heat and/or an electromagnetic ray to produce a semi-cured organic-inorganic hybrid material layer;
   (C) pressing a master mold having a predetermined fine raised and depressed pattern formed thereon directly against an exposed surface of the semi-cured organic-inorganic hybrid material layer by an imprinting method to transfer the fine raised and depressed pattern onto the exposed surface of the semi-cured organic-inorganic hybrid material layer; and
   (D) irradiating the semi-cured organic-inorganic hybrid material layer onto which the fine raised and depressed pattern is transferred with an electromagnetic ray to cure the semi-cured organic-inorganic hybrid material layer,
   wherein the organic-inorganic hybrid material comprises:
   a) an organosilicon compound comprising:
   a compound represented by the formula (I):

   $$R^1{}_n SiX_{4-n} \qquad (I)$$

(wherein n represents 1 or 2; when n is 2, each $R^1$ is optionally the same or different; $R^1$ represents an organic group; and one or more of $R^1$ represent a vinyl group-containing hydrocarbon group; X represents a hydroxyl group or a hydrolyzable group; and each X is optionally the same or different),
   a compound represented by the formula (II):

   $$R^2{}_n SiX_{4-n} \qquad (II)$$

(wherein n represents 1 or 2; when n is 2, each $R^2$ is optionally the same or different; $R^2$ represents an organic group excluding a vinyl group-containing hydrocarbon group, which has a carbon atom bonded directly to Si in the formula; X represents a hydroxyl group or a hydrolyzable group; and each X is optionally the same or different), and a hydrolysis condensate thereof if present, wherein {[the compound of the formula (I)]+[a unit derived from the compound of the formula (I) in the hydrolysis condensate if present]}/{[the compound of the formula (I)]+[the compound of the formula (II)]+[a unit derived from the compound of the formula (I) in the hydrolysis condensate if present]+[a unit derived from the compound of the formula (II) in the hydrolysis condensate if present]}×100 is 30 to 100 mol %; and {[the compound of the formula (II)]+[a unit derived from the compound of the formula (II) in the hydrolysis condensate if present]}/{[the compound of the formula (I)]+[the compound of the formula (II)]+[a unit derived from the compound of the formula (I) in the hydrolysis condensate if present]+[a unit derived from the compound of the formula (II) in the hydrolysis condensate if present]}×100 is 0 to 70 mol %;

b) an electromagnetic ray-curable compound; and
c) a silanol condensation catalyst.

2. The method for producing a replica mold according to claim 1, further comprising the step of (E) applying a mold releasing layer onto a surface of the fine raised and depressed pattern obtained in the step (D).

3. The method for producing a replica mold according to claim 1, wherein the organic-inorganic hybrid material comprises a material for a mold releasing layer.

4. The method for producing a replica mold according to claim 1, wherein {[the compound of the formula (I)]+[a unit derived from the compound of the formula (I) in the hydrolysis condensate if present]}/{[the compound of the formula (I)]+[the compound of the formula (II)]+[a unit derived from the compound of the formula (I) in the hydrolysis condensate if present]+[a unit derived from the compound of the formula (II) in the hydrolysis condensate if present]}×100 is 30 to 95 mol %; and {[the compound of the formula (II)]+[a unit derived from the compound of the formula (II) in the hydrolysis condensate if present]}/{[the compound of the formula (I)]+[the compound of the formula (II)]+[a unit derived from the compound of the formula (I) in the hydrolysis condensate if present]+[a unit derived from the compound of the formula (II) in the hydrolysis condensate if present]}×100 is 5 to 70 mol %.

5. The method for producing a replica mold according to claim 1, wherein the electromagnetic ray-curable compound is 80 mass % or less based on the total mass of a solid content of the composition.

6. The method for producing a replica mold according to claim 1, wherein the silanol condensation catalyst is a photosensitive compound.

7. A replica mold obtained by a method according to claim 1.

8. The method for producing a replica mold according to claim 1, wherein step (D) is a step of removing the master mold from the semi-cured organic-inorganic hybrid material layer, and then irradiating the semi-cured organic-inorganic hybrid material layer with an electromagnetic ray to cure the semi-cured organic-inorganic hybrid material layer.

* * * * *

UNITED STATES PATENT AND TRADEMARK OFFICE
CERTIFICATE OF CORRECTION

PATENT NO. : 9,511,514 B2
APPLICATION NO. : 13/702873
DATED : December 6, 2016
INVENTOR(S) : Kazuhisa Kumazawa et al.

It is certified that error appears in the above-identified patent and that said Letters Patent is hereby corrected as shown below:

In the Specification

In Column 4, Line 28, "after a neat imprint" should read --after a heat imprint--.

In Column 6, Line 8, "two or more kinds may foe mixed" should read --two or more kinds may be mixed--.

In Column 8, Line 42, "methyltri(meth)acryloxysiiane" should read --methyltri(meth)acryloxysilane--.

In Column 9, Line 67, "5129, 6602, 3301" should read --5129, 6602, 8301--.

In Column 10, Line 16, "cat ionic" should read --cationic--.

In Column 11, Line 50, "wave length" should read --wavelength--.

In Column 13, Line 64, "It is preferably 30% or" should read --It is preferably 80% or--.

In Column 16, Line 56, "The master mold can foe" should read --The master mold can be--.

In Column 17, Line 7, "foe used" should read --be used--.

In Column 18, Line 35, "each $R^3$ may foe the same or different" should read --each $R^3$ may be the same or different--.

In Column 21, Line 21, "alipathic di carboxylic acids" should read --alipathic dicarboxylic acids--.

In Column 22, Line 44, "3.39 g" should read --3.89 g--.

Signed and Sealed this
Fifteenth Day of August, 2017

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,511,514 B2

In Column 25, Lines 18-19, "by a bar coat" should read --by a barcoat--.

In Column 26, Line 6, "L/S could foe confirmed" should read --L/S could be confirmed--.

In Column 27, Line 25, "using a nano imprint device" should read --using a nanoimprint device--.